United States Patent [19]

Swisher, Jr. et al.

[11] 4,270,801
[45] Jun. 2, 1981

[54] STEERING AND CUTTER DRUM POSITIONING IN A PAVED ROADWAY PLANING MACHINE

[75] Inventors: George W. Swisher, Jr., Oklahoma City; Donald W. Smith, Edmond; Larry W. Teel, Yukon, all of Okla.

[73] Assignee: CMI Corporation, Oklahoma City, Okla.

[21] Appl. No.: 66,336

[22] Filed: Aug. 14, 1979

[51] Int. Cl.³ .................................................. E01C 23/12
[52] U.S. Cl. ...................................... 299/1; 180/6.48; 404/84; 299/39
[58] Field of Search ................ 299/39, 41, 1; 404/84; 180/6.48

[56] References Cited

U.S. PATENT DOCUMENTS

| | | | |
|---|---|---|---|
| 1,995,450 | 3/1935 | French | 404/84 |
| 3,272,099 | 9/1966 | Drake | 404/84 |
| 3,414,327 | 12/1968 | Austin | 299/39 X |
| 3,771,892 | 11/1973 | Munyon et al. | 404/84 |
| 3,807,887 | 4/1974 | Tate | 404/84 |
| 3,811,787 | 5/1974 | Beaty et al. | 404/84 |
| 3,846,035 | 11/1974 | Davin | 404/84 |
| 3,879,149 | 4/1975 | Smith et al. | 404/72 |
| 4,029,165 | 6/1977 | Miller et al. | 404/84 X |
| 4,140,193 | 2/1979 | Miller | 404/84 X |
| 4,186,968 | 2/1980 | Barton | 299/39 |

Primary Examiner—Ernest R. Purser
Attorney, Agent, or Firm—Dunlap, Codding & McCarthy

[57] ABSTRACT

A wheeled roadway planing machine in which the wheels are pivotable by individual hydraulic rams for steering purposes. Each ram is controlled by a rotary, blocked-center valve and the valves are simulataneously actuated by a linkage which establishes a pattern of off-center displacements of their valve members to initiate pivoting of the wheels. The valves are mounted on pivotable wheel representation members which pivot with the wheels, via cables connecting the representation members to support shafts upon which the wheels are mounted, to return the valves to their blocked-center positions as the wheels pivot to a pattern of positions on the chassis of the machine similar to the pattern of displacements of the valve members resulting from operation of the linkage. A cutting drum is mounted on the chassis to form a cut in the roadway, such cut having a shape determined by the position of the chassis on the support shafts. Such position and the depth of each side of the cut are shown by scales, mounted on the chassis near each end of the drum and near the rear end of the chassis, and pointers mounted on rods positioned by the roadway surface. String lines, extending between supports pivotally attached to the ends of the chassis, provide a grade reference for control of the position of the chassis relative to the roadway. Portions of the supports which engage the roadway are laterally positionable on the chassis for selection of a grade line.

23 Claims, 18 Drawing Figures

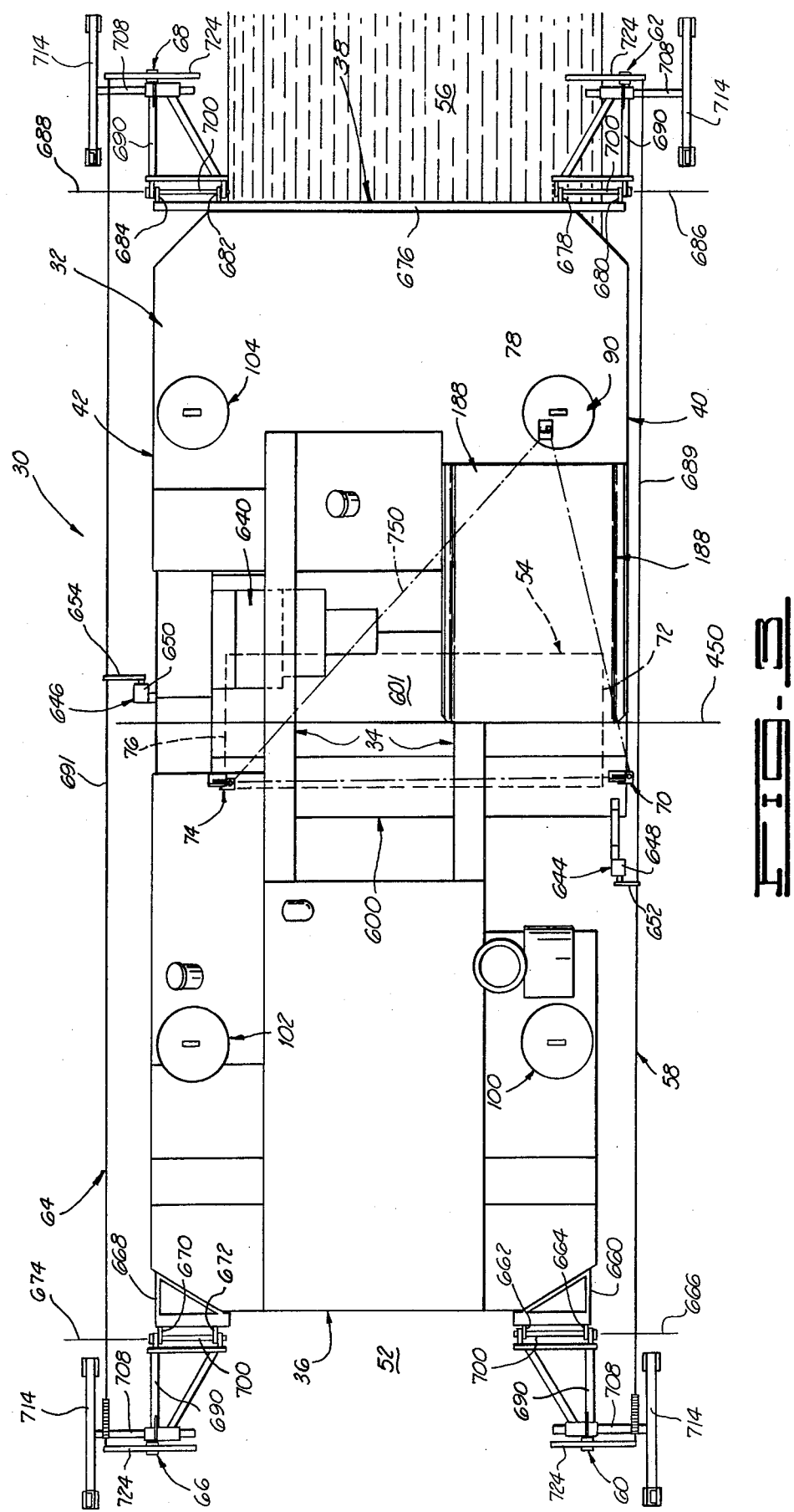

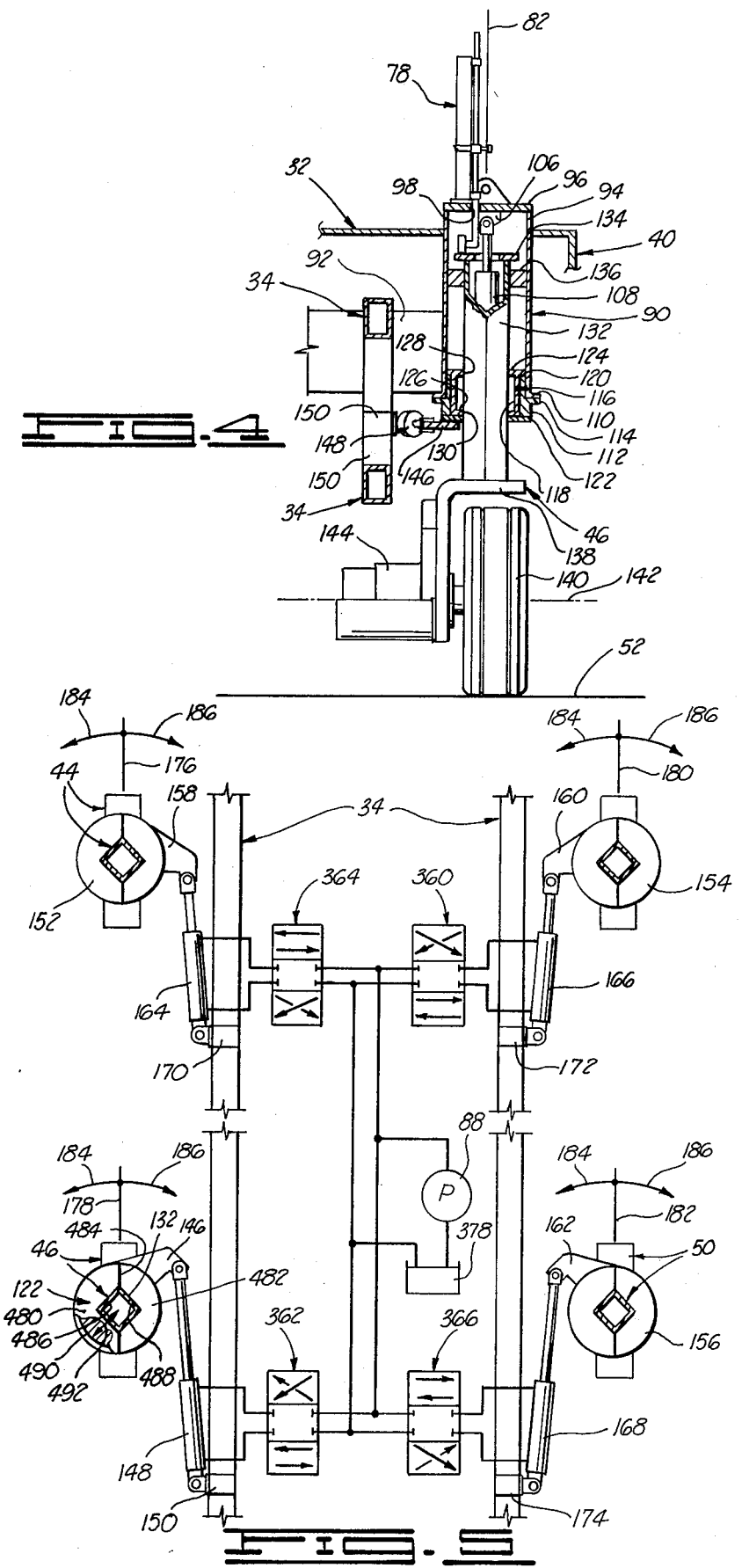

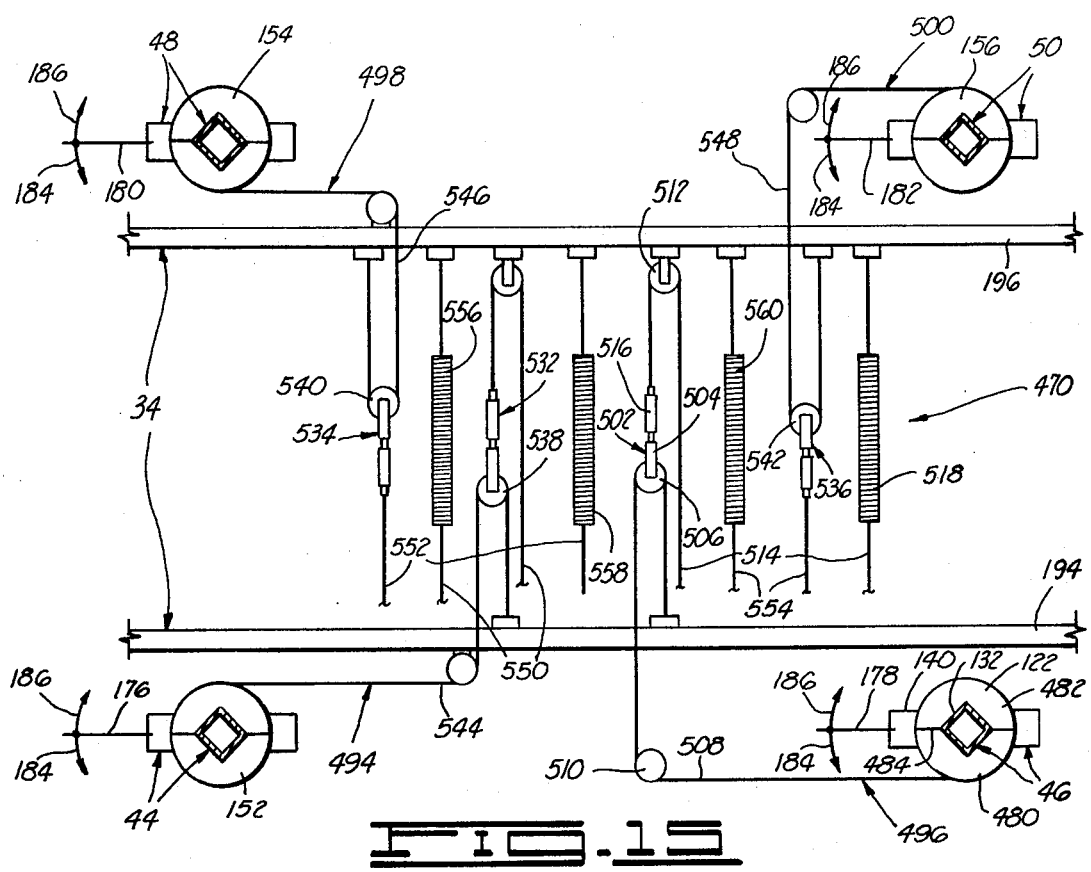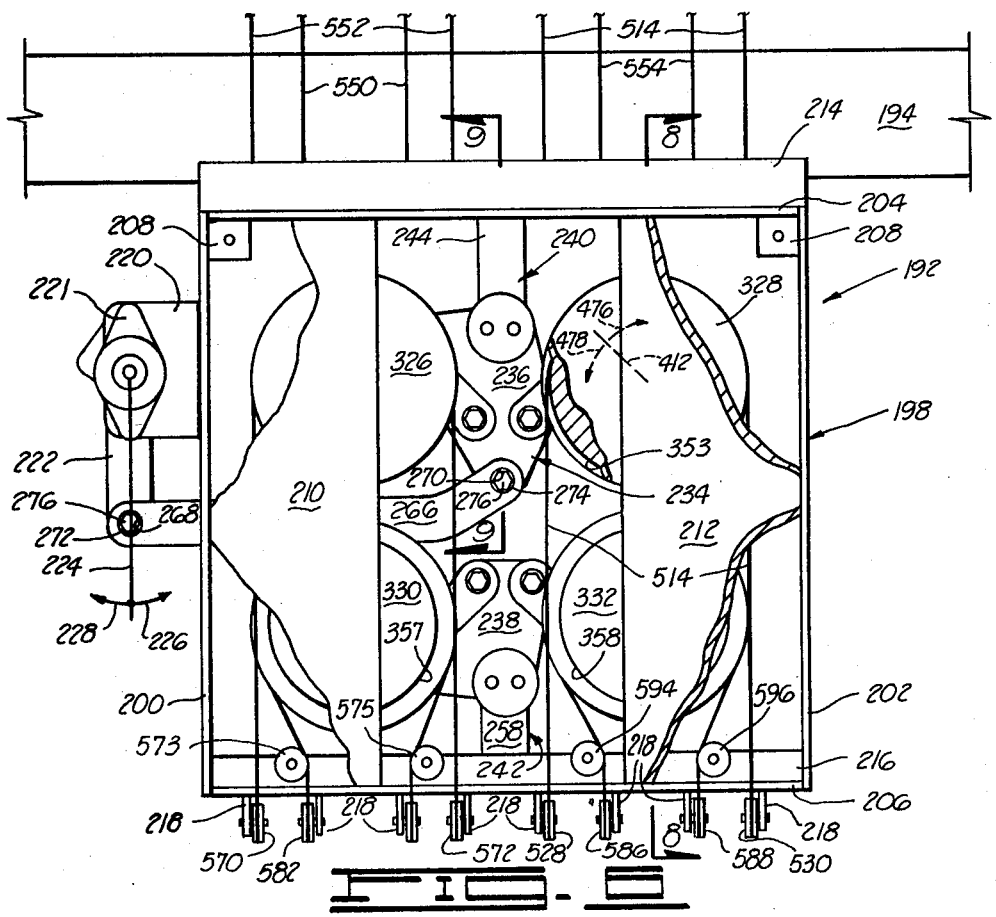

STEERING AND CUTTER DRUM POSITIONING IN A PAVED ROADWAY PLANING MACHINE

SUMMARY OF THE INVENTION

The present invention relates generally to construction machines and, more particularly, but not by way of limitation, to construction machines having a cutting tool for forming a cut in the surface of a paved work surface as the machine is driven therealong.

In the past it has been common practice to repair blemishes in paved surfaces, such as potholes, cracks and the like in roadways, by the addition of asphalt concrete to the surface. This addition has, in some cases, taken to form of patching the surface and, in other cases, has taken the form of repaving; that is, of overlaying an existing, blemished surface with a new layer of asphalt. It has been found that better results of repair can be achieved, in either case, by preparing the surface for the addition of asphalt by planing away a portion of the surface prior to the addition of new asphalt. A machine for planing such surfaces has been disclosed in U.S. Pat. No. 4,139,318, issued Feb. 13, 1979 to Jakob, et al., and assigned to the assignee of the present invention.

A number of problems are encountered in the use of machines of this type and these problems vary with the circumstances under which machines are used. A very common problem occurs when a machine is used to plane a roadway or the like wherein are located relatively small obstacles, such as manholes, which must be avoided in the planing operation. It is desirable that the machine be large in order that obstacle-free areas can be planed as rapidly as possible and this size has, in the past, resulted in difficulty in the maneuvering of machines about such small obstacles. While linkages, for connecting and turning wheel and track assemblies for turning a machine, are known which will provide various types of machines with a reasonable degree of maneuverability, such linkages are generally unsuited for a planing machine because of the weight and size the planing machine must have to carry out the planing operation. On the other hand, where the machine is guided by servomechanisms, known servomechanisms have not, in the past, been able to provide the machine with the maneuverability required to avoid small obstacles. For example, a known servomechanism includes a master-slave system wherein one track assembly supporting a machine, the master track, is positioned by opening a valve to a ram which turns the master track assembly and providing a means for repositioning the case of the valve to close the valve as the master track assembly reaches a selected position and a similar valve and repositioning means for causing the slave track assembly to follow the master track assembly. While such a servomechanism is capable of steering a heavy machine, such as a planing machine, the turning of track assemblies by equal amounts does not provide a machine with the degree of maneuverability required in many of the applications of a machine used to plane a paved surface.

In the present invention, this problem is solved via a linkage which is connected between representations of the transporters rather than between the transporters themselves. The linkage is utilized to open a plurality of valves mounted on the representation members and a feedback assembly, connecting the transporters to the representations thereof is utilzed to cause the representations to pivot with the transporters to close the valves as the transporters assume desired positions for steering the machine.

It is common in machines of this type to mount the tool used to form a cut in the work surface on the chassis of the machine and to control the position of the tool relative to the work surface by positioning the chassis of the machine relative thereto. Problems arise both in the control of the position of the chassis during a planing operation and in the initial positioning thereof at the commencement of a planing operation. In general, machines of this type are provided with some means for establishing a reference for the chassis with respect to the work surface and a control circuit which senses the position of the reference relative to the chassis of the machine and provides control signals for extabishing the attitude of the chassis from the reference. A common reference is the average grade of an interval of the work surface containing the machine and various types of grade averaging assemblies have been developed to permit such an average grade to be used as a reference. In the past, a problem which has arisen in many cases is that portions of the work surface engaged by a grade averaging assembly have been severely blemished with the result that overcontrol of the chassis of the machine has been affected to leave a cut surface with undesirable undulations. The present invention includes a novel stringline support assembly, attachable to the ends of the construction machine for supporting the ends of a stringline utilized for averaging control, which permits a selection of a wide range of lines, fore and aft of the chassis of the machine, along which the average grade of the work surface is to be measured. For this purpose, the stringline support assembly has a pivot arm which is attached to the end of the chassis and a walking beam which is attached to the pivot arm via a walking beam support arm which is slidable laterally on the pivot arm.

Where control of the attitude of the chassis is accomplished during a planing operation via automatic controls, such controls must be set at the commencement of the planing operation and it is desirable that the controls be set as quickly as is feasible. In the past, it has been found that such setting can be facilited by mounting scales on portions of the chassis adjacent the transporters which move the machine along the work surface and to support pointers by the transporters to indicate the positions of the transporters with respect to the chassis. The pointers are zeroed when the cutting tool grazingly contacts the work surface so that the attitude of the chassis can be established for a desired depth of cut by means of manually raising and lowering the chassis on the transporters while observing the position of the pointers on the scales. While such scales and pointers have been found useful for establishing the position of the chassis of the machine when automatic control of the attitude of the chassis is to be carried out, a problem has arisen where, as is often the case, the attitude of the machine is to be controlled manually. For example, a common type of contract for a planing operation will call for a particular depth of the work surface to be removed. Often, such removal is most conveniently carried out by manually positioning the chassis of the machine during the cutting oeration provided that the position of the cutting tool is known with respect to the work surface. The present invention provides the ease of setting of automatic controls which has heretofore been provided by mounting pointers on the transporters of the machine and further permits for manual control of the attitude of the chassis by utilizing pointers which are positioned by uncut portions of the work surface mounted on the chassis of the machine. By this means, the depth of the cut, at each side thereof, is measured directly and such information is visually displayed to the operator of the machine. A third pointer which is supported by one of the transporters of the machine of the present invention and which rides in the cut made by the cutting tool, overlays a third scale on the chassis of the machine so that the three scales and three pointers can be utilized, at the commencement of a planing operation wherein automatic control of the attitude of the chassis of the machine is to be carried out, to permit rapid positioning of the chassis for setting the automatic controls.

An object of the present invention is to provide a planing machine with a high degree of maneuverability while avoiding the use of heavy linkages between transporters which support the machine on a work surface and move the machine therealong.

Another object of the present invention is to provide a planing machine having the capability of grade averaging control utilizing a selection of lines longitudinal of the chassis of the machine for establishing the control grade.

Yet a further object of the present invention is to provide a planing machine with a scale assembly which permits gauging of the cut made by the machine in a work surface for manual control of the position of the chassis of the machine relative to the work surface, at such times that is desirable to employ manual control, while further permitting the rapid positioning of the chassis of the machine for the setting of devices utilized to automatically control the cut made in the work surface.

Other objects, features and advantages of the present invention will become apparent from the following detailed specification when read in conjunction with the attached drawings and appended claims.

BRIEF DESCRIPTION OF THE DRAWINGS

FIG. 3 is a plan view of the construction machine.

FIG. 4 is an elevational view of one of the transporters of the construction machine taken along line 4—4 of FIG. 3.

FIG. 5 is a plan view of a portion of the central frame of the construction machine showing the rams and hydraulic circuit utilized to pivot the transporters for steering.

FIG. 6 is a top view of the steering assembly of the construction machine.

FIG. 15 is a plan view of portions of the feedback assembly utilized in steering the construction machine.

DESCRIPTION OF THE PREFERRED EMBODIMENT

Figure 1:
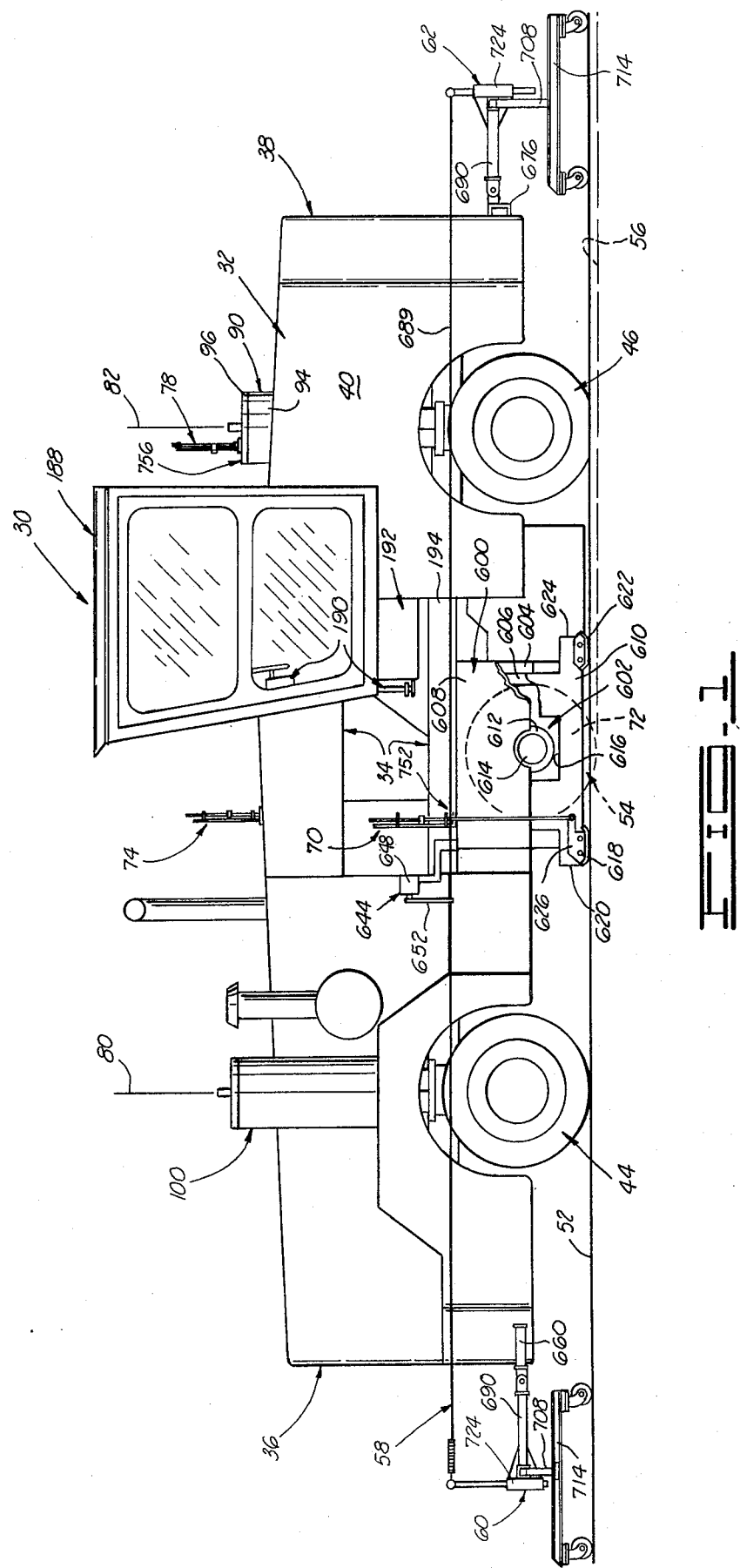
FIG. 1 is a first side elevational view of the construction machine of the present invention.
Figure 2:
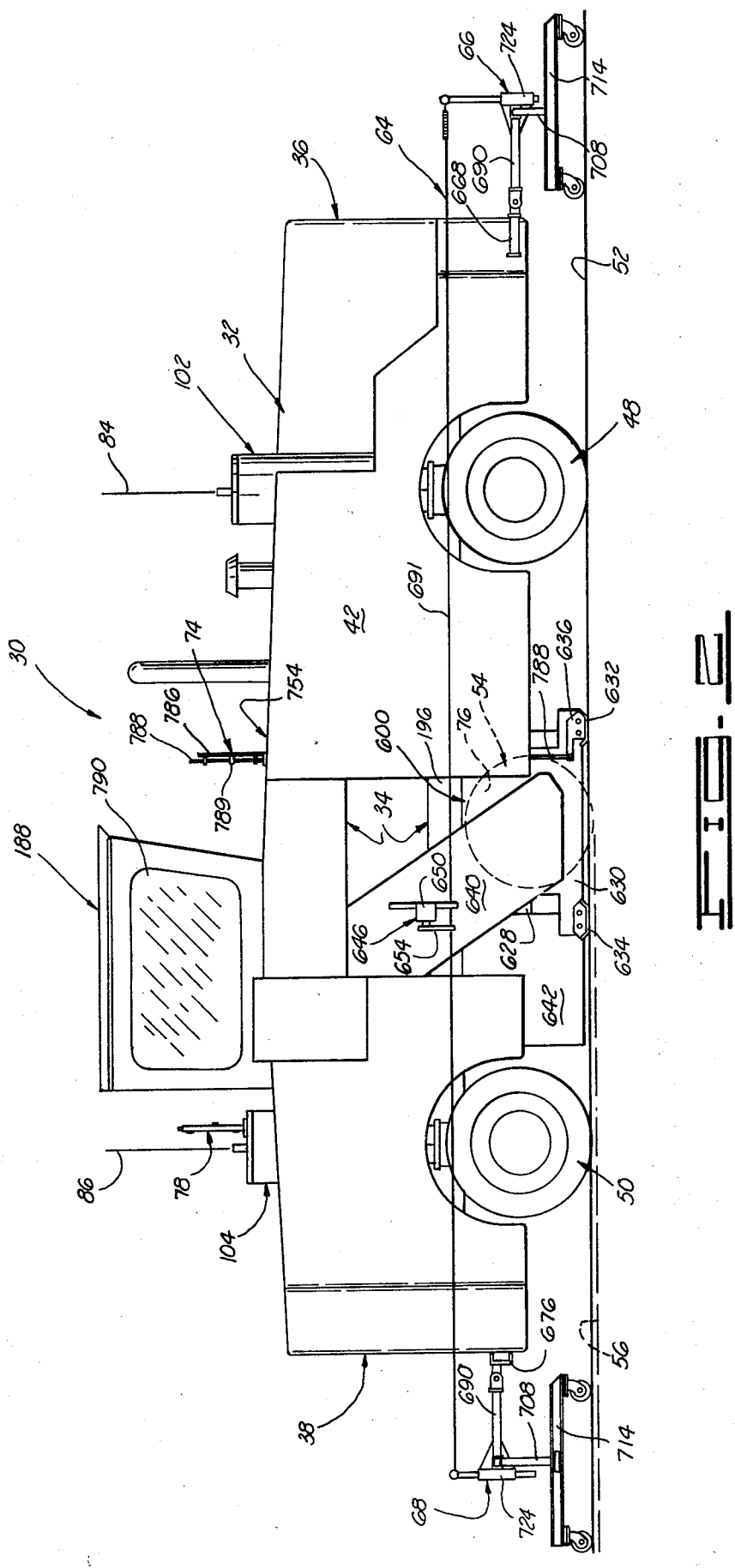
FIG. 2 is a second side elevational view of the construction machine.

Referring now to the drawings in general and to FIGS. 1, 2, and 3 in particular, shown therein and designated by the general reference numeral 30 is a construction machine constructed in accordance with the present invention. In general, the construction machine 30 comprises: a chassis 32, constructed above a central frame 34 and having a forward end 36, a rear end 38, a first side 40 and an opposing second side 42 (FIG. 3), the sides 40, 42 extending generally between the ends 36, 38 of the chassis 32; a plurality of transporters 44 and 46 (FIG. 1), and 48 and 50 (FIG. 2) which support the chassis 32 above a work surface 52 and, as will be described below, move the machine 30 therealong; a cutting tool 54 (indicated in dashed lines in FIGS. 1, 2 and 3) disposed on a medial portion of the chassis 32 for forming a cut 56 in the work surface 52 as the machine 30 is moved therealong; a first grade averaging assembly 58 (FIG. 1, 3) disposed generally adjacent the first side 40 of the chassis 32 and having a first forward stringline support apparatus 60 pivotally connected to the forward end 36 of the chassis 32 and a first rear stringline support apparatus 62 pivotally connected to the rear end 38 of the chassis 32; a second grade averaging assembly 64 (FIGS. 2, 3) disposed generally adjacent the second side 42 of the chassis 32 and having a second forward stringline support apparatus 66 pivotally connected to the forward end 36 of the chassis 32 and a second rear stringline support apparatus 68 pivotally connected to the rear end 38 of the chassis 32; and an indicator assembly comprised of a first indicator sub-assembly 70 (FIG. 1) disposed on the first side 40 of the chassis 32 near a first end 72 of the cutting tool 54, a second indicator sub-assembly 74 (FIG. 2) disposed on the second side 42 of the chassis 32 near a second end 76 of the cutting tool 54 and a third indicator sub-assembly 78 (FIG. 1) disposed generally on the first side 40 of the chassis 32 near the rear end 38 thereof. As shown in FIGS. 1 and 2, two of the transporters, 44 and 46, are disposed on the first side 40 of the chassis 32, the transporter 44 near the forward end 36 of the chassis 32 and the transporter 46 near the rear end 38 of the chassis 32, and two of the transporters, 48 and 50, are disposed on the second side 42 of the chassis 32, the transporter 48 near the forward end 36 of the chassis 32 and the transporter 50 near the rear end 38 of the chassis 32, as will be discussed below, the transporters 44-50 are arranged in a rectangular array on the chassis 32. By means which will be presently discussed, the transporters 44-50 are pivotally mounted on the chassis for pivotation about axes 80, 82 (FIG. 1), 84 and 86 (FIG. 2) respectively, the axes 80-86 extending substantially perpendicularly to the work surface 52, and each transporter is driven in rolling engagement with the work surface 52 (one transporter 46 engages portions of the work surface 52 within the cut 56) so that the machine 30 can be moved along the work surface 52 and such movement can be guided, or steered, by concertedly pivoting the transporters 44–50 such that the lines of rolling contact thereof with the work surface 52 are formed into a preselected pattern with respect to the chassis 32. Similarly, the transporters 44–50 are axially positionable on the chassis 32, along the axes 80–86 so that the chassis 32 can be positioned in height and attitude relative to the work surface 52 and such positioning is utilized to position the cutting tool 54 to set the profile of the cut 56. In the preferred embodiment of the machine 30, motive power for the operation of components of the machine 30 is provided by pressurized hydraulic fluid, as will be discussed below, and the machine 30 is provided with a prime mover (not shown), such as a deisel engine, and a plurality of hydraulic pumps (not shown—one pump 88 has been schematically indicated in FIG. 5) to supply the pressurized hydraulic fluid.

The mounting of the transporters 44–50 on the chassis 32 has been shown in FIG. 4 for the transporter 46 disposed on the first side 40 of the chassis 32 near of rear end 38 thereof. With exceptions to be noted below, the transporters 44, 48 and 50 are indentical to the transporter 46 and are mounted in an indentical manner so that it will not be necessary for purposes of the present disclosure to provide a detailed description of each of the transporters 44–50 and the manner of mounting thereof on the chassis 32. Rather, it will suffice to describe the transporter 46 and the mounting thereof on the chassis 32 and to note the differences between the transporter 46 and the transporters 44, 48 and 50 and the difference in the mounting between transporter 46 and transporters 44, 48 and 50.

For the purpose of mounting the transporter 46b on the chassis 32, the chassis 32 includes a mounting well 90 which is secured to the chassis 32 in any convenient manner as, for example, via a beam 92 welded to the central frame 34 of the chassis 32. The mounting well 90 has a cylindrical portion 94 having an axis coinciding with the axis 82 of pivotation of the transporter 46 and the upper end of the mounting well 90 is closed by a cap 96 secured in any convenient manner to the cylindrical portion 94. An aperture 98 is formed in the cap 96 of the mounting well 90 for a purpose to be described below. Mounting wells 100, 102 and 104 are similarly provided for the transporters 44, 48 and 50 (FIGS. 1, 2 and 3) and the mounting wells 100, 102 and 104 differ from the mounting well 90 in that no apertures, such as the aperture 98, are formed in the caps of the mounting wells 100, 102 and 104. The mounting wells 90, 100–104 are disposed in a rectangular array in the preferred embodiment and, as will be clear from the description of the mounting of transporter 46 in mounting well 90, such description applying to the mounting of transporters 44, 48 and 50 in mounting wells 100–104, such arrangement of the mounting wells 90, 100–104 positions the transporters 44–50 in a rectangular array.

Referring again to FIG. 4, a lug 106 is mounted on the inner surface of the cap 96 and the lug 106 is connected to the piston rod of a hydraulic ram 108 which extends along the axis 82 of pivotation of the transporter 46. The body of the ram 108 is secured to the transporter 46 so that the transporter 46 can be moved axially along the axis 82 to raise and lower portions of the chassis near the first side 40 and the rear end 38 thereof. Similar rams (not shown) are provided for the transporters 44, 48 and 50 so that the chassis 32 can be positioned with respect to the work surface 52, both in attitude and height, via the rams in the mounting wells 90, 100, 102 and 104. A hydraulic control circuit (not shown), supplied with hydraulic pressure from one of the pumps (not shown) driven by the prime mover (not shown) is utilized for positioning the chassis 32 and the control circuit can be manually adjusted to position the chassis 32 or can be adjusted via hydraulic sensors to automatically position the chassis in accordance with a preselected reference. As will be described below, the grade averaging assemblies 58, 64 provide one such reference. The hydraulic control circuit is conventional and need not be described for purposes of the present disclosure.

A flange 110 is formed about the lower end of the cylindrical portion 94 of the mounting well 90 and a cylindrical sleeve 112, having an axis coinciding with the axis 82 and having a flange 114 extending about a medial portion thereof, is secured to the lower end of the mounting well 90 via bolts (not shown) passing through the flanges 110 and 114. A portion of the sleeve 112 extends into the mounting well 90 for securing a square-to-round adapter 116, utilized in pivoting the transporter 46 about the axis 82, and the lower end of the mounting well 90 s will now be described. The square-to-round adapter 116 has a cylindrical portion 118 which mates with the inner periphery of the sleeve 112 so that the square-to-round adapter 116 is supported for pivotation about the axis 82 by the sleeve 112. An exterior flange 120 at the upper end of the cylindrical portion 118 engages the upper end of the sleeve 112 and a circular feedback sheave 122, secured to the lower end of the square-to-round adapter 116 via bolts (not shown), engages the lower end of the sleeve 112 to axially position the square-to-round adapter 116 at the lower end of the mounting well 90 while permitting the square-to-round adapter 116 to pivot with respect thereto. (The feedback sheave 122 is a portion of the guidance system of the machine 30 and the structure thereof will be described in more detail below.) Interior flanges 124, 126 are formed on the interior periphery of the square-to-round adapter 116, at the upper and lower ends thereof respectively, and square apertures 128, 130 respectively, centered on the axis 82 and aligned such that the sides of aperture 130 are parallel to the sides of aperture 128, are formed through the flanges 124, 126 respectively.

The transporter 46 comprises a support shaft 132 which is formed of square tubing to mate with the apertures 128, 130 in the square-to-round adapter 116. The support shaft 132 passes through the square-to-round adapter 116 so that the support shaft 132 has an upper portion disposed in the mounting well 90 and a lower portion which extends out of the lower end of the mounting well 90. An annulus 134 (see also FIG. 18) is welded to the upper end of the support shaft 132 and a second square-to-round adapter 136, comprised of a circular plate having a square aperture formed through the center thereof, is welded to the support shaft 132 near the upper end thereof, the upper square-to-round adapter 136 slidingly engaging the inner periphery of the cylindrical portion 94 of the mounting well 90 so as to coact with the square-to-round adapter 116 to center the support shaft 132 about the axis 82. (The transporters 44, 48 and 50 differ from the transporter 46 in that no annulus, such as the annulus 134, is included in the transporter 44, 48 and 50. The purpose of the annulus 134 will be discussed below.)

An inverted L-shaped support bracket 138 is welded to the lower end of the support shaft 132 to support a ground engagement member 140 on the lower end of the support shaft 132 for rolling engagement with the work surface 52. In a preferred embodiment of the present invention, the ground engagement member 140 is a wheel rotationally driven about an axis 142, transverse to the axis 82 of the transporter 46, via a hydraulic motor 144 mounted on the bracket 138 and supplied with pressurized hydraulic fluid from one of the pumps (not shown) driven by the prime mover (not shown). However, as will be clear to those skilled in the art, the present invention is not limited to a wheeled machine; rather, the present invention encompasses tracked machines and the term "rolling engagement" as used herein means that portions of the groun engagement member 140 engaging the work surface 52 are instantaneously at rest.

For pivoting the transporter 46 about the axis 82, the transporter 46 includes a lever arm 146 (see also FIG. 5), which can be conveniently welded to the lower side of the feedback sheave 122. The lever arm 146 extends transversely to the axis 82 and has an aperture (not shown) near the extensive end thereof to permit the lever arm 146 to be pivotally connected to the piston rod of a hydraulic ram 148. As is more clearly shown in FIG. 5, the ram 148 extends along the exterior of the central 34 of the chassis 32 and the body thereof is pivotally connected to a vertical brace 150 welded to the central framework 34 so that the transporter 46 can be pivoted about the axis 82 by extending and retracting the piston rod of the ram 148.

With the exceptions noted above, the transporters 44, 48 and 50 are constructed and are connected to the chassis 32 in the same manner that the transporter 46 is connected to the chassis 32. In particular, as shown in FIG. 5, feedback sheaves 152, 154 and 156 are provided for the transporters 44, 48 and 50 respectively, and lever arms 158, 160 and 162 are welded to feedback sheaves 152, 154 and 156, respectively. Hydraulic rams 164, 166 and 168, connected between the lever arms 158, 160 and 162, respectively, and braces 170, 172 and 174, respectively, on the chassis 32 are utilized to pivot the transporters 44, 48 and 50 respectively about the axes 80, 84 and 86, respectively, in the same manner that the ram 148 pivots the transporter 46 about the axis 82. For purposes of describing the guidance system of the machine 30, the rams 148, 164 and 168 connected to the lever arms 146, 158, 160 and 162, respectively, of transporters 46, 44, 48 and 50, respectively, will be referred to herein as corresponding to such transporters 46, 44, 48 and 50.

As will be clear to those skilled in the art, steering of the construction machine 30 can be accomplished via the positioning of the totality of the transporters 44-50 about the axes 80-86 respectively. That is, the relative orientations of the transporters 44-50 are determinative of the motion of the machine 30 along the work surface 52 as the machine 30 is driven therealong via the hydraulic motors, such as the motor 144, of the transporters 44-50. For purposes of describing the steering of the machine 30 and the control thereof, conventions will be used herein to describe coactive relationships among pluralities of similar elements such as, for example, the coactive positioning of the transporters 44-50 to steer the machine 30. It will be clear that the machine 30 will move on a straight line path extending forwardly of the machine 30 at such times that the ground engagement members, such as the ground engagement member 140, of the transporters 44-50 roll along reference lines, indicated by numerals 176, 178, 180 and 182 for the transporters 44, 46, 48 and 50 respectively, extending longitudinally of the chassis 32 and directed forwardly of the chassis 32. (In FIG. 5, the forward end 36 of the chassis 32 is diposed above the portions of the frame 34 shown therein). Steering of the machine 30 is accomplished by concertedly pivoting the transporters 44-50 such that the lines along which the ground engagement members of the transporters 44-50 roll are displaced from the lines 176-182 in a coherent manner. For purposes of describing these pivotations, the directions of pivotation of the transporters 44-50 are defined with respect to the chassis and the definition of a direction of pivotation for one transporter 44-50 extends to all transporters 44-50. That is, where a first direction of pivotation is chosen for one transporter 44-50 to be counterclockwise pivotation of such transporter 44-50 on the chassis 32 as viewed from above the chassis 32, a counterclockwise pivotation of any transporter 44-50 on the chassis as viewed from above the chassis 32 will also be pivotation in a first pivotation direction. With this convention, first and second directions of pivotation of the transporters 44-50 designated 184 and 186 respectively, have been shown in FIG. 5 for purposes of describing the steering of the machine 30. A similar convention is utilized herein to describe the sense of hydraulic pressure supplied to the hydraulic rams 148, 164, 166 and 168. (As used herein, the term "sense of hydraulic pressure" denotes the supply of pressurized hydraulic fluid to one of two ports of a ram while draining hydraulic fluid from the other of the two ports so that one sense of hydraulic pressure will extend the piston of the ram while an opposite sense of hydraulic pressure will retract the piston of the ram.) That is, where hydraulic pressure is supplied to the ports of a ram to turn the transporter in correspondence therewith in the first direction 184, the sense of hydraulic pressure supplied to such ram will be referred to herein as a first sense of hydraulic pressure; where hydraulic pressure is supplied to the ports of a ram to turn the transporter in correspondence therewith in a second direction 186, the sense of hydraulic pressure supplied to such ram will be referred to herein as a second sense of hydraulic pressure. Thus, with the first and second directions of pivotation 184, 186 defined as shown in FIG. 5, a first sense of hydraulic pressure for the rams 148 and 164 will be a sense of hydraulic pressure supplied so as to extend the piston rods of the rams 148 and 164 while a first sense of hydraulic pressure for the rams 166 and 168 will retract the piston rods thereof.

Referring once again to FIG. 1, the construction machine 30 is provided with an operator's cabin 188, mounted high on the first side 40 of the chassis 32 and in a medial portion thereof with respect to the length of the chassis 32. A conventional steering mechanism 190 is mounted in the operator's cabin 188 and a portion of the steering mechanism 190 extends through the floor of the cabin 188 to connect to a transporter pivotation initiating assembly 192 which is mounted beneath the operator's cabin 188 and which is utilized to supply pressurized hydraulic fluid to the rams 148, 164, 166 and 168. For clarity of illustration, details of the construction of the transporter pivotation initiating assembly 192 have been omitted in FIG. 1 and FIGS. 6 through 11 have been provided to illustrate the preferred form of the transporter pivotation initiating assembly 192.

For reasons which will become clear below, it is convenient to orient the transporter pivotation initiating assembly 192 so as to align with the general front-rear, first side-second side layout of the chassis 32. Specifically, the central frame 34 has a first lower base beam 194 (FIG. 1), extending longitudinally along the underside of the chassis 32 and displaced toward the first side 40 of the chassis 32 from the center thereof, and a second lower base beam 196 (FIG. 2), extendng longitudinally along the underside of the chassis 32 parallel to the base beam 194 and displaced toward the second side 42 of the chassis 32 from the center thereof. As shown in FIG. 1, the transporter pivotation initiating assembly 192 is disposed a short distance above the base beam 194, 196 and the transporter pivotation initiating assembly 192 is positioned generally toward the first side 40 of the chassis 32 from the lower base beam 194. The transporter pivotation initiating assembly 192 is mounted within a case 198 which is oriented with respect to the base beams 194, 196 as has been illustrated for the first lower base beam 194 in FIGS. 6 and 7 wherein are shown top and bottom views respectively of the transporter pivotation initiating assembly 192.

Figure 7:
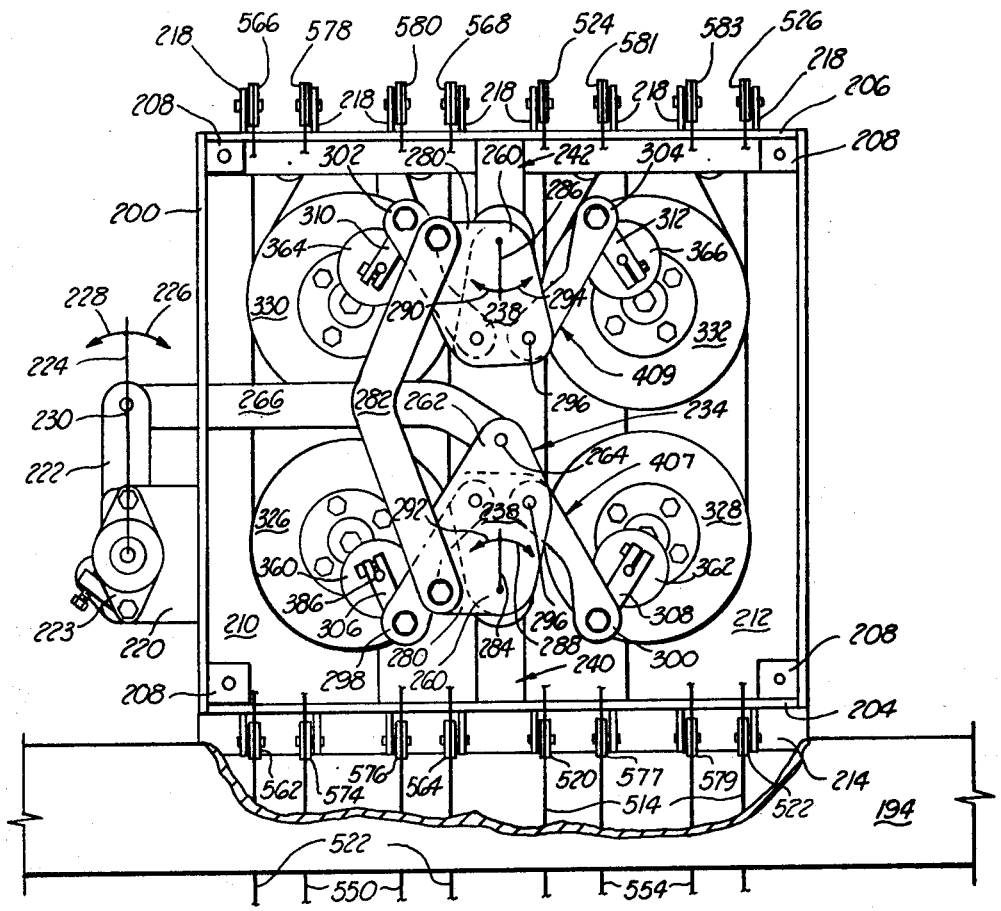
FIG. 7 is a bottom view of the steering assembly.
Figure 8:
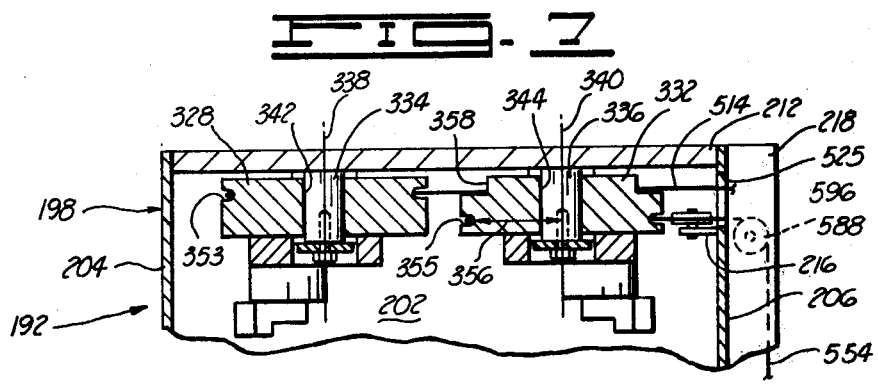
FIG. 8 is a partial cross-section of the steering assembly taken along line 8—8 of FIG. 6.

Referring specifically to FIGS. 6, 7 and 8, the case 198 is constructed of a plurality of plates to form a rectangular parallelpiped-shaped enclosure, such plates including a forward end wall 200 disposed substantially perpendicularly to the first lower base beam 194 and extending generally toward the first side 40 of the chassis 32 therefrom; a rear end wall 202, substantially parallel to forward end wall 200 and displaced a distance rearwardly therefrom; an inner side wall 204 extending between the end walls 200, 202 substantially parallel to the first lower base beam 194 and displaced a short distance therefrom toward the first side 40 of the chassis 32; and an outer side wall 206 extending between the end walls 200, 202 substantially parallel to the inner side wall 204 and displaced a distance therefrom toward the first side 40 of the chassis 32. A bottom cover (not shown) extends across and closes the bottom of the case 198 and suitable connectors 208 (FIGS. 6 and 7) having threaded apertures formed therethrough for receiving bolts (not shown) inserted through holes in the bottom cover (not shown) are welded into the corners of the case 198 at the bottom thereof for connecting the bottom cover to remaining portions of the case 198. The top of the case 198 is closed by three plates which extend from the inner side wall 204 to the outer side wall 206, such plates including: a forward representation member mounting plate 210 (FIG. 6) extending along the forward end wall 200 and welded to the forward end wall 200 and the side walls 204, 206 (portions of the forward representation member mounting plate 210 have been cut away in FIG. 6 to show portions of the transporter pivotation initiating assembly 192 disposed within the case 198); a rear representation member mounting plate 212 extending along the rear end wall 200 and welded to the rear end wall 200 and the side walls 204, 206 (portions of the rear representation member mounting plate 212 have been cut away in FIG. 6 to show portions of the transporter pivotation initiating assembly 192 disposed within the case 198); and a central plate (not shown) welded between the representation member mounting plates 210, 212 and to the side plates 204, 206.

A flange 214 (FIG. 6) is welded to the exterior of the case 198 along the bottom edge of the inner side wall 204, the flange 214 extending the length of the inner side wall 204 and extending substantially perpendicularly from the inner side wall 204 toward the center of the machine 30. A flange 216 (FIG. 8) is welded to the interior of the case 198 a short distance from the top of the case 198, the flange 216 extending the length of the outer side wall 206 generally parallel to the representation member mounting plates 210, 212. On the exterior of the case 198, eight ribs 218 are welded to outer side wall 206, the ribs 218 extending from the top of the case 198 to the bottom thereof generally parallel to the end walls 200, 202 of the case 198. The purpose of the flanges 214, 216 and of the ribs 218 will be discussed below.

A bracket 220 is welded to the exterior of the case 198, on the forward end wall 200 thereof, for pivotally mounting the lower end of the stacking mechanism 190 on the case 198. The bracket 220 is mounted off center on the case 198 with respect to the side walls 204, 206, the bracket 220 being positioned nearer the inner side wall 204 than the outer side wall 206. The steering mechanism 190 includes a lug 222 near the lower end thereof, the lug 222 extending laterally of the bracket 220 generally toward the outer side wall 206 and the lower portions of the steering mechanism are mounted on the case 198 such that the lug 222 moves in an arc generally parallel to the top and the bottom of the case 198 in response to manual operation of the steering mechanism 190 by the operator of the machine 30. (Universal joints, not shown, in the steering mechanism 190 and bearing blocks 221, FIG. 6, and 223, FIG. 7, mounted on the bracket 220, are utilized to position portions of the steering mechanism 190 for such pivotation of the lug 222 in a conventional manner.) The lug 222 has a reference position, shown in FIGS. 6 and 7, wherein the lug extends along an axis 224 generally parallel to the forward end wall 200. The lug 222 is pivotable away from the axis 224, toward or away from the forward end wall 200 and, for purposes of description of the steering of the machine 30, the directions of pivotation of the lug 222 from the reference position thereof are designated herein as a first direction 226, wherein the extensive end of the lug 222 is moved toward the forward end wall 200 from the reference position of the lug 222, and as a second direction 228, wherein the extensive end of the lug 222 is moved away from the forward end wall 200 (FIGS. 6, 7). A circular aperture 230 (FIG. 7) is formed near the extensive end of the lug 222 and the aperture 230 is threaded for pivotally connecting the lug 222 to the transporter pivotation initiating assembly 192 as will be discussed below.

The transporter pivotation initiating assembly 192 includes a linkage assembly 234 including a first ternary link 236 and a second ternary link 238 which are pivotally mounted on the case 192 via a first link mount 240, mounting the first ternary link 236 on the inner side wall 204 of the case 198, and a second link mount 242, mounting the second ternary link 238 on the outer side wall 206 of the case 198. The link mounts 240, 242 are identical and extend from the side walls 204, 206 into the interior of the case 198 along a central line with respect to forward and rear end walls 200, 204 thereof.

Figure 9:
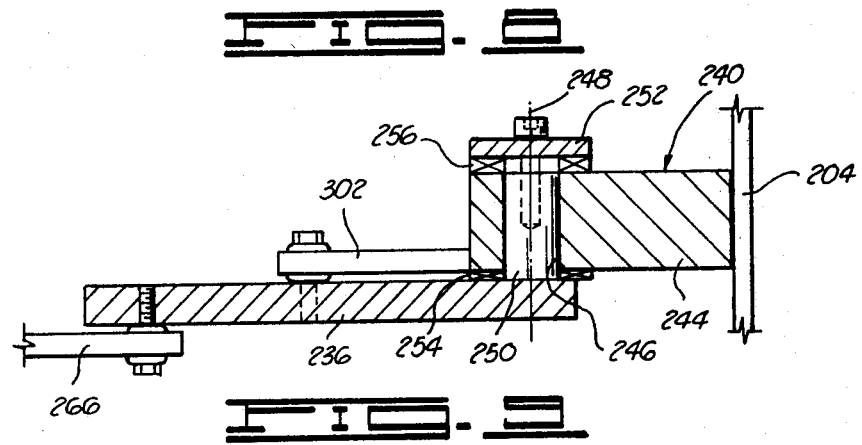
FIG. 9 is a cross-section of a ternary link mount in the steering assembly taken along the line 9—9 of FIG. 6.

FIG. 9, wherein is shown a cross-section of the first link moun 240, has been provided to illustrate the common structure of the link mounts 240, 242 and the manner in which the link mounts 240, 242 are utilized to mount the linkage assembly 234 on the case 198. The link mount 240 comprises a bar member 244 which is welded at one end thereof to the inner side wall 204 and extends substantially perpendicularly therefrom. A transverse circular bore 246 is formed through the bar member 244 near the extensive end thereof and bar member 244 is oriented on the case 198 such that the axis 248 of the bore 246 extends substantially parallel to the inner side wall 204 and substantially perpendicularly to the top and bottom of the case 198. A stud 250 is welded to the first ternary link 236 to mate with the bore 246 and the stud 250 extends through the bore 246 so as to journal the first ternary link 236 on the bar member 244. The first ternary link 236 is secured to the bar member 244 via a circular disc 252, having a diameter greater than the bore 246, bolted to the extensive end of the stud 250. A bearing 254, extending about the stud 250, is interposed between the first ternary link 236 and the bar member 244 and a bearing 256, similarly extending about the stud 250, is interposed between the disc 252 and the bar member 244 so that the first ternary link 236 is free to pivot about the axis 248 of the bore 246. The second link mount 242 (FIG. 6) similarly has a bar member 258 welded to the outer side wall 206 and the second ternary link 238 is mounted on the bar member 258 for pivotation about an axis substantially parallel to the axis 248 in the same manner that the first ternary link 236 is mounted on the bar member 244.

The ternary links 236, 238 are formed of flat metal plate and the studs which connect the links 236, 238 to the bar members 244, 258 are welded to one side of each of the links 236, 238 so that the pivotation axes of the links 236, 238 are substantially perpendicular to the planar configuration of the links 236, 238. As shown in FIG. 7, each of the ternary links has a triangular portion 260 (dotted lines have been utilized to delineate portions of the ternary links 236, 238 in FIG. 7) and the links 236, 238 are connected to the link mounts 240, 242 near the apices of the triangular portions 260. The first ternary link 236 has an ear portion 262 on the base of the triangular portion 260 thereof; that is, opposite the apex of the triangular portion 260 thereof. An aperture 264 is formed through an ear portion 262 and the aperture 264 is threaded. The lug 222 on the steering mechanism 190 is connected to the transporter pivotation initiating assembly 192 via an arm 266 which passes through a slot (not shown) in the forward end wall 200 of the case 198 and which is pivotally connected to the lug 222 and the ear 262. For this purpose, circular apertures 268 (FIG. 6) and 270 are formed in the arm 266, near the ends thereof, and spherical bearings 272, 274 are pressed into the apertures 268, 270. Bolts 276 and 278, inserted through the bearings 272, 274, are screwed into the apertures 230 and 264, in the lug 222 and the first ternary link 236 respectively, to pivotally secure the arm 266 to the lug 222 and the first ternary link 236.

Returning to FIG. 7, each of the ternary links 236, 238 has an ear 280 formed on the side thereof nearest the forward end wall 200 and threaded holes (not shown) are formed through the ears 280 of the ternary links 236, 238 about axes parallel to the pivotation axes of the ternary links on the case 198. A cross-arm 282, having spherical bearings pressed into circular apertures formed through portions of the cross-arm 282 near the ends thereof, is pivotally bolted to the ternary links 236, 238 via the threaded holes in the ears 280 thereof and via the spherical bearings in the cross-arm 282. The hole in the ear 280 of the second ternary link 238 is spaced from the axis of pivotation of the second ternary link on the case 198 a distance equal to he spacing between the hole in the ear 280 of the first ternary link 236 and the axis of pivotation of the first ternary link 236 on the case 198 and the spacing between the spherical bearings in the cross-arm 282 is the same as the distance between the axes of pivotation of the ternary links 236, 238 on the case 198. Thus, the axes of pivotation of the ternary links 236, 238 on the case 198 and of the cross arm 282 on the ternary links 236, 238 are positioned at the corners of a parallelogram so that a pivotation of the first ternary link 236 on the case 198 is accompanied by a pivotation, of equal magnitude, of the second ternary link 238 on the case 198.

As is the case with the lug 222, reference positions are defined for the ternary links and FIG. 7 has been drawn for the case wherein the ternary links 236, 238 are disposed in the reference positions thereof. In the reference positions, the triangular portions 260 of the ternary links 236, 238 are disposed symmetrically with respect to axes 284, 286, defined for the first and second ternary links 236, 238 respectively, which extend from the axes of pivotation of the ternary links 236, 238 along a line connecting the axes of pivotation of the ternary links 236, 238. (The positions of the holes in the ears 280 of the ternary links 236, 238 are selected such that the second ternary link 238 will be in the reference position thereof when the first ternary link 236 is in the reference position thereof.) The length of the arm 266 connecting the lug 222 to the first ternary link 236 is selected to position the first ternary link 236 and, accordingly, the second ternary link 238 in the reference positions thereof when the lug 222 is in the reference position thereof. Accordingly, the ternary links 236, 238 can be simultaneously pivoted away from the reference positions thereof by a pivotation of the lug 222 away from the reference position thereof in one of the first and second directions 226, 228. Further, the direction in which a ternary link 236, 238 is pivoted from its reference position depends on whether the lug 222 is pivoted in the first direction 226 or in the second direction 228. For purposes of description of the steering of the construction machine 30 to be given below, the direction of pivotation of either ternary link 236, 238 from the reference position thereof at such times that the lug 222 is pivoted in the first direction 226 thereof will be referred to herein as a first direction of pivotation of such ternary link 236, 238 and the opposing direction of pivotation of such ternary link 236, 238 from the reference position thereof will be referred to herein as a second direction of pivotation of such ternary link. The first directions of pivotation of the ternary links 236, 238 have been shown in FIG. 7 and are designated by the numerals 288 and 290 for the first and second ternary links respectively. Similarly, the second directions of pivotation are designated 292 and 294 in FIG. 7 for the first and second ternary links 236, 238 respectively.

Near the bases of the triangular portions 260 of the ternary links 236, 238, two threaded holes 296 are formed through each of the ternary links 236, 238 about axes parallel to the pivotation axes of the ternary links 236, 238. (For clarity of illustration, only one of the holes 296, through each ternary link 236, 238, has been numerically designated in the drawings.) The holes 296 in each ternary link 236, 238 are equidistant from the axis of pivotation of such ternary link 236, 238 on the case 198 and the holes 296 in the second ternary link 238 are spaced the same distance from the axis of pivotation of the second ternary link 238 that the holes 296 in the first ternary link 236 are spaced from the axis of pivotation of the first ternary link 236. The holes 296 are symmetrically positioned on the links 236, 238 with respect to the triangular portions 260 thereof. That is, at such times that the ternary links 236, 238 are in the reference positions thereof, all holes 296 are equally spaced from a line connecting the axes of pivotation of the ternary links 236, 238 and each hole is identically spaced toward the center of the case 198 from the axis of pivotation of the ternary link 236, 238 wherein such hole 296 is formed.

The linkage assembly 234 comprises two identical first intermediate links 298, 300 which are pivotally connected to the first ternary link 236 via spherical bearings pressed into circular apertures near one end of each first intermediate link 298, 300 and the holes 296 in the triangular portion 260 of the first ternary link 236. The linkage assembly 234 similarly comprises two second intermediate links 302, 304, identical to the first intermediate links 298, 300 and connected to the second ternary link 238 in the same manner that the first intermediate links 298, 300 are connected to the first ternary link 236. The opposite end of each intermediate link 298-304 is similarly provided with a spherical bearing and the spherical bearings near such opposite ends are utilized to pivotally connect the first intermediate links 298, 300 to first terminal links 306 and 308 respectively and to pivotally connect the second intermediate links 302, 304 to second terminal links 310 and 312 respectively. As is the case with the intermediate links 298-304, the terminal links 306-312 are identical and the structure of the terminal links 306-312 has been shown for the terminal link 306, in FIGS. 10 and 11. As shown therein, the terminal link 306 is a bar having a threaded, blind bore 314 formed near one end thereof for connection to the intermediate link 298 via a spherical bearing in the manner described above. Near the opposite end of the terminal link 306, a hole 316 is formed through the terminal link 306 parallel to the hole 314. A slit 318, extending radially from the hole 316, is formed in the terminal link 306 between the hole 316 and the end of the terminal link 306 nearest the hole 316 to permit the terminal link 306 to be clamped to a shaft inserted through the hole 316 via a bolt 320 screwed into a partially threaded hole 322 formed transversely through portions of the terminal link 306 wherein the slit 318 is formed. A hole 324 is formed through the terminal link 306 substantially parallel to the holes 314 and 316 and substantially midway therebetween for a purpose to be described below. The termnal links 306-312 are mounted within the case 198, as will be described below, such that the axes of the holes formed therein for connection to the intermedate links 298-304 are parallel to the axes of pivotation of the ternary links 236, 238 on the case 198 so that the linkage assembly 234 has a generally flat structure and components thereof pivot in arcs generally parallel to the top and bottom of the case 198 in response to pivotation of the lug 222 of the steering mechanism 190.

Referring once again to FIGS. 6, 7 and 8, the transporter pivotation initiating assembly 192 further comprises four transporter representation members 326-332 which have the form of circular sheaves and which are placed in a rectangular array disposed symmetrically with respect to the pivotation axes of the ternary links 236, 238. That is, a rectangle formed by lines extending between the centers of the transporter representation members 326-332 is bisected both by a line extending between the axes of pivotation of the ternary links 236, 238 and the perpendicular bisector of such line.

The transporter representation members 326-332 are grouped into two pairs, a pair of first transporter representation members comprising the transporter representation members 326 and 328 and a pair of second transporter representation members comprising the transporter representation members 330 and 332, for purposes of connecting the transporter representation members 326-332 to the linkage assembly 234 in a manner to be described below. Specifically, the pair of first transporter representation members 326, 328 are disposed near the inner side wall 204 of the case 198 on opposite sides of the first ternary link 236 and are associated with the first ternary link 236 by connection to the first terminal links 306, 308 respectively as will be described below. Similarly, the pair of second transporter representation members 330, 332 are disposed near the outer side wall 206 of the case 198 on opposite sides of the second ternary link 238 and are associated with the second ternary link 238 via connection to the second terminal links 310, 312 respectively, as will be described below.

Figures 10, 11:
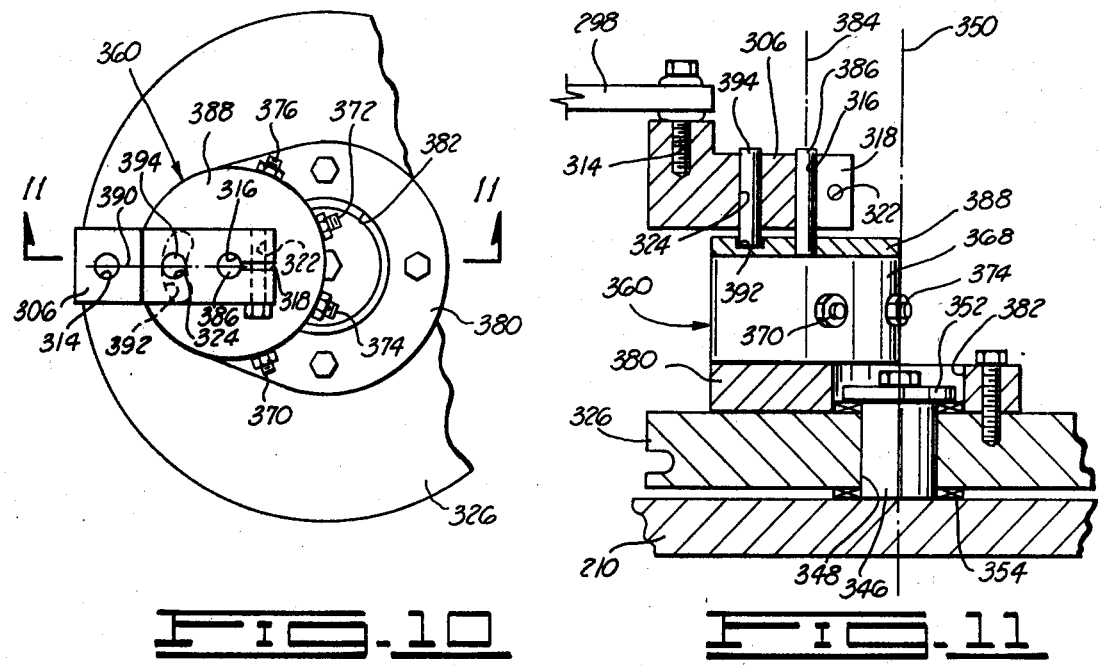
FIG. 10 is a bottom view of one of the transporter representation members showing the mounting of one of the blocked-center valves thereon.
FIG. 11 is a cross-section taken along line 11—11 of FIG. 10.

The transporter representation members 326-332 are pivotally mounted on the case 198, for pivotation about the symmetry axes thereof, in a common manner that has been shown for the transporter representation members 328 and 332 in FIG. 8 and for the transporter representation member 326 in FIG. 11. As shown in FIG. 8, spaced apart cylindrical studs 334, 336 are welded to the rear representation member mounting plate 212 and extend therefrom into the interior of the case 198 about axes 338, 340 respectively which are parallel to the axes of pivotation of the ternary links 236, 238 on the case 198. Circular bores 342, 344 are formed through the transporter representation members 328, 332 respectively about the symmetry axes thereof and the bores 342, 344 mate with the perpheries of the studs 334, 336 respectively to journal the transporter representation members 328, 332 on the case 198. Similar studs (one such stud is shown in FIG. 11) are provided on the forward representation member mounting plate 210, such studs being spaced a distance equal to the spacing of the studs 334 and 336, and the transporter representation members 326 and 330 are similarly provided with bores for mounting the transporter representation members 326, 330 on the forward representation member mounting plate 210. The manner in which the transporter representation members 326-332 are secured to the studs is more particularly shown for the mounting of the transporter representation member 326 on the forward representation member mounting plate 210 in FIG. 11 wherein the stud for mounting the transporter representation member 326 has been designated by the numeral 346, the bore through the transporter representation member 326 has been designated by the numeral 348 and the axis of the stud 346 has been designated by the numeral 350. As shown in FIG. 11, a disc 352, having a diameter larger than the bore 348 bolts to the extensive end of the stud 346 so that the transporter representation member can be mounted on the stud 346 by slipping the transporter representation member 326 thereon with the disc 352 removed and the transporter representation member 326 is then secured to the stud 346 by bolting the disc 352 to the stud 346. Suitable bearings 354 are interposed between the representation member mounting plate 210 and the transporter representation member 326 and between the transporter representation member 326 and the disc 352 so that the transporter representation member 326 can pivot about the axis 350 of the stud 346. Similar discs and bearings are provided for the transporter representation members 328, 330 and 332. The studs which mount the transporter representation members 326–332 are positioned on the plates 210, 212 to form the transporter representation members into the rectangular array noted above.

For purposes which will become clear below, the first transporter representation members 326, 328 are constructed differently from the second transporter representation members 330, 332 and such differences in structure have been shown in FIGS. 6 and 8. Each of the first transporter representation members 326, 328 has a groove formed circumferentially in the outer circular periphery thereof adjacent the side of the transporter representation member, 326 or 328, nearest the representation member mounting plate, 210 or 212, respectively, whereon the first transporter representation members 326 and 328 are mounted. (The groove in the first transporter representation member 328 is shown in FIGS. 6 and 8 and designated by the numeral 353 therein.) Each of the second transporter representation members 330, 332 has a groove formed circumferentially in the outer circular periphery thereof adjacent the side of the transporter representation member, 330 or 332, farthest from the representation member mounting plate, 210 or 212 respectively, whereon the second transporter representation members 330 and 332 are mounted. (Such groove in the second transporter representation member 332 is shown in FIG. 8 and designated 335 therein.) The grooves 353, 355 in the transporter representation members 328, 332, and corresponding grooves in the transporter representation members 326, 330, are formed on a common radius which has been shown for the groove 355 in FIG. 8 and designated by the numeral 356 therein. The second transporter representation members 330, 332 are further provided with circumferential grooves 357, 358 respectively, (FIG. 6) formed to intersect the sides of transporter representation members 330, 332 nearest the representation member mounting plates 210, 212 respectively whereon the transportation representation members 330, 332 are mounted. The groove 358 is aligned with the groove 353 in transporter representation member 328 and the groove 357 is aligned with the groove (not shown) in transporter representation member 326, such groove in transporter representation member 326 corresponding to the groove 353, for a purpose to be described below.

Referring specifically to FIG. 7, the transporter representation members 326, 328, 330, 332 are connected to the linkage assembly 324 via four identical rotary, four-way, blocked-center hydraulic valves 360, 362, 364, 366 respectively which are connected between the transporter representation members 326, 328, 330, 332 and the terminal links 306, 308, 310 and 312 respectively. The manner in which the valves 360–366 connect the transporter representation members 326–332 to the terminal links 306–312 is the same for all valves 360–366 and such manner of connection has been shown for the valve 360, the transporter representation member 326 and the terminal link 306 in FIGS. 10 and 11.

The valve 360 has a case 368 and a valve member (not shown) pivotally mounted within the case 368. Inlet ports 370, 372 and outlet ports 374, 376 are provided on the case 368 so that, when inlet port 370 is connected to a hydraulic pump such as the pump schematically indicated and designated by the numeral 88 in FIG. 5 and inlet port 372 is connected to a sump, schematically indicated and designated by the numeral 378 in FIG. 5, from which hydraulic fluid is supplied to such pump, pressurized hydraulic fluid can be supplied to a selected one of the outlet ports 374, 376 and drained from the other of the outlet ports 374, 376 by a pivotation of the valve member (not shown) of the valve 360 in a selected direction from the blocked-center position thereof. Thus, the valve 360 can supply a hydraulic ram connected to the outlet ports 374, 376 thereof with no pressure, when the valve 360 is in blocked-center positioned thereof, a first sense of hydraulic pressure in response to a pivotation of the valve member in one direction from the blocked-center position thereof, and a second sense of hydraulic pressure in response to a pivotation of the valve member in the other direction from the blocked-center position thereof. Moreover, the direction in which the valve member is to be pivoted to supply a first or second sense of hydraulic pressure to a ram is selectable by the connection of the ram to the valve; that is, by the choice of which of two hydraulic conduits connected to the ram is connected to the outlet port 374 and which is connected to the outlet port 376. In the present invention, selection rules are utilized to select the valve 360–366 to be connected to a particular ram 148, 164–168 and to select the direction in which a valve member is to be turned to supply a first sense of hydraulic pressure to the particular ram to which each valve 360–368 is connected. These selection rules will be discussed in detail below.

The case 368 of the valve 360 is mounted on one side of a bracket 380 having the general form of an elongated plate and the case 368 is mounted adjacent one end of the bracket 380. Near the other end of the bracket 380, a bore 382 is formed therethrough parallel to the pivotation axis 384 of the valve member of the valve 360 and the bore 382 is dimensioned to receive the disc 352, which holds the transporter representation member 326 on the forward representation member mounting plate 210, and the bearing 354 interposed between the disc 352 and the transporter representation member 326. As shown in FIGS. 10 and 11, the valve 360 is assembled to the transporter representation member 326 by abutting the side of the bracket 380, opposite the side thereof upon which the valve 360 is mounted, to the transporter representation member 326 with the bore 382 centered on the pivotation axis 350 of the transporter representation member 326 and bolting the bracket 380 to the member 326.

The mounting of the valve 360 near one end of the bracket 380 and the centering of the bore 382, near the opposite end of the bracket 380, on the pivotation axis 350 of the transporter representation member 326 displaces the axis 384 of pivotation of the valve member of the valve 360 a preselected distance from the pivotation axis 350 as has been shown in FIG. 11. As will be explained below, such displacement enhances the operation of the transporter pivotation initiating assembly 192 but the present invention is not limited to the inclusion of such a displacement in the mounting of the valve 360–366 on the transporter representation members 326–332. As used herein, the words parallel as applied to the axis of pivotation of a transporter representation member 326–332 and the valve member of a valve 360–366 mounted thereon includes coincidence of such axes of pivotation.

The valve member of the valve 360 is mounted on a shaft 386 which extends through a cover 388 of the valve case 368 along the pivotation axis 384. The shaft 386 is sized to mate with the hole 316 through the terminal link 306 and the valve 360 is connected to the linkage assembly 234 by inserting the shaft 386 into the hole 316 and tightening the bolt 320 to clamp portions of the terminal link 306 about the hole 316 on the shaft 386 in the conventional manner.

The terminal links 306–312 each have a reference position with respect to the respective transporter representation members 326–332 mounting the valves to which the terminal links are connected and these reference positions are defined with regard to the blocked-center positions of the valve members of the valves 360–366 and with regard to a line between the pivotation axes of the valve members and the transporter representation members 326–332 as will now be explained for the terminal link 306. Prior to clamping the terminal link 306 to the shaft 386, the shaft 386 is positioned to place the valve member of the valve 360 in the blocked-center position thereof. The terminal link 306 is then positioned about the shaft 386 such that the center of the hole 314 utilized to connect the terminal link 306 to the intermediate link 298 is disposed on a line 390 which intersects the pivotation axes 350 and 384 as shown in FIG. 10. The terminal link 306 is clamped to the shaft 386 as has been described above. The angular disposition of the terminal link 306 with respect to the transporter representation member 326 such that the above described alignment of the hole 314 and the axes, 350, 384 occurs is defined herein as the reference position of the terminal link 306 with respect to the transporter representation member 326. The reference positions of the terminal links 308, 310, and 312 with respect to the transporter representation members 328, 330 and 332 respectively are defined in the same manner. (Should the valves 360–366 be positioned on the transporter representation members 326–332 such that the axes of pivotation of the valve members of the valves 360–366 coincide with the axes of pivotation of the transporter representation members 326–332, the reference positions of the links 306–312, with respect to the transporter representation members 326–332, can be selected arbitrarily subject only to the condition that the valve members of the valves 360–366 are in the blocked-center positions thereof in the reference positions of the links 306–312.)

An arcuate slot 392 is formed in the surfaces of the cover 388 of the valve 360 adjacent the link 306 and underlying the hole 324 in the link 306 in the reference position of the link 306. A pin 394, driven through the hole 324, extends into the slot 392 to limit the pivotation of the valve member of the valve 360 from the blocked-center position thereof in order to prevent a reversal of the operation of the valve 360 which would result should the valve member of the valve 360 be turned through too large an angle from the blocked center position thereof.

The above described construction of the transporter pivotation initiating assembly 192 permits each of the transporter representation members 326–332 to assume either of two positions at such times that the ternary links 236, 238 and the terminal links 306–312 are in the reference positions thereof. For example, referring to the transporter representation member 326 and the terminal link 306 in FIG. 7, terminal link 306 can extend generally toward the inner side wall 204 from the shaft 386 at such times that the terminal link 306 is in the reference position thereof on the transporter representation member 326 and the first ternary link 236 is in the reference position thereof. However, terminal link 306 can also extend generally toward the outer side wall 206 from the shaft 386 at such times that the ternary link 236 and the terminal link 306 are in the reference positions thereof as defined above. For purposes of establishing a preferred mode of steering for the construction machine 30, reference positions for the transporter representation members 326–332 are defined in accordance with a selection rule as follows: the reference position of a transporter representation member is that position thereof wherein the terminal link connected thereto via one of the valves will be in the reference position thereof on the transporter representation member and will extend toward the nearer of the side walls 204, 206 to the transporter representation member whereon such terminal link is mounted when the ternary links 236, 238 are in the reference positions thereof.

Figure 12:
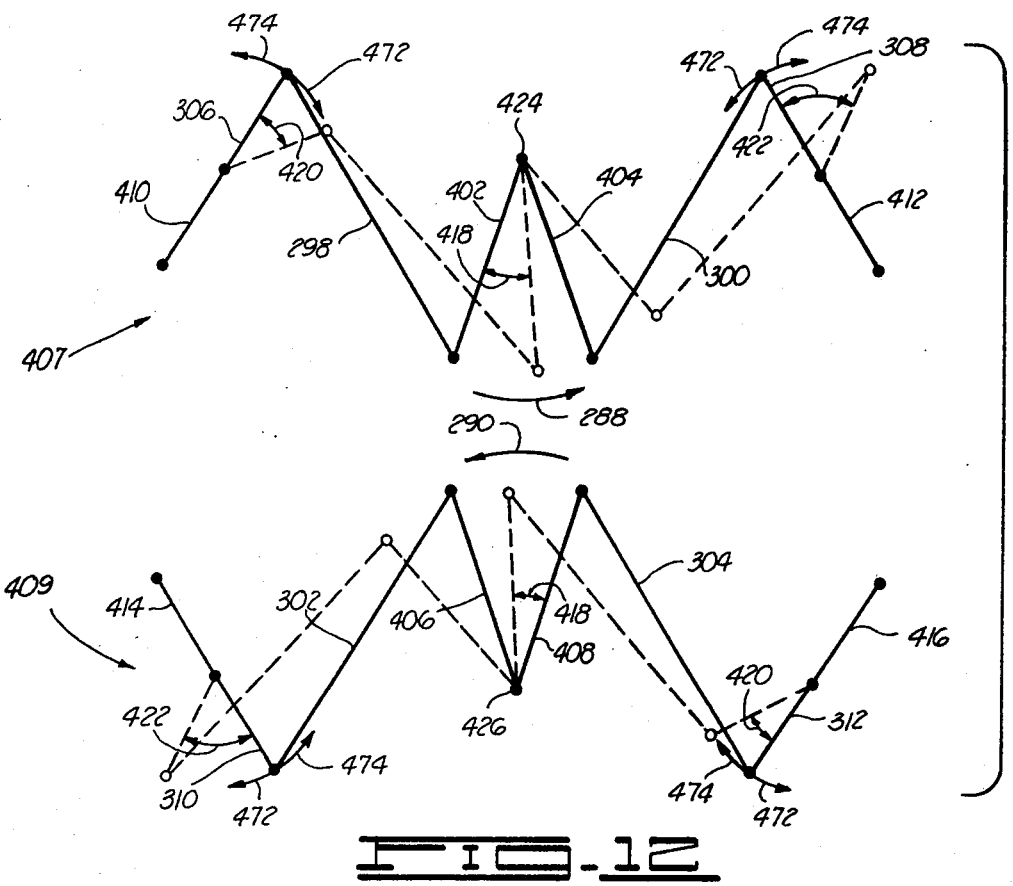
FIG. 12 is a schematic representation of the linkage assembly of the steering assembly.
Figure 13:
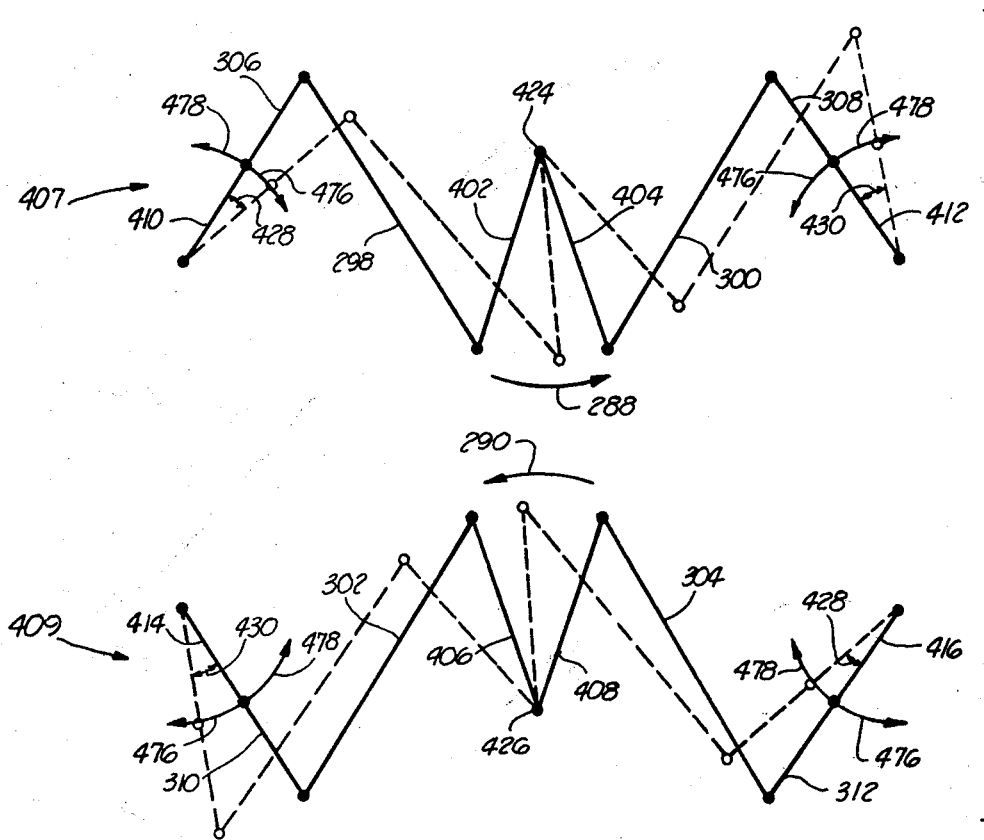
FIG. 13 is another schematic representation of the linkage assembly of the steering assembly.

The above grouping of the intermediate links 298–304, the terminal links 306–312 and the transporter representation members 326–332 into pairs of first intermediate links, first terminal links and first transporter representation members and into pairs of second intermediate links, second terminal links and second transporter representation members divides the linkage assembly into a first linkage sub-assembly into a first linkage sub-assembly 407, based on the first ternary link 236 and including the first intermediate links 298, 300 and first terminal links 306, 308, and into a second linkage sub-assembly 409, based on the second ternary link 238 and including the second intermediate links 302, 304 and second terminal links 310, 312. With the reference positions of the ternary links 236, 238, the terminal links 306–312 and the transporter representation members 326–332 defined as above, the first linkage sub-assembly 407 connects the pivotation axis of the first terminal link 306 on the first transporter representation member 326 (via the connection of the first terminal link 306 to the shaft of the valve 360) to the pivotation axis of the first terminal link 308 on the first transporter representation member 328 through a plurality of link arms which lie along a zig-zag path as has been shown in solid lines for the reference positions of the ternary links 236, 238, the reference positions of the terminal links 306–312 and the reference positions of the transporter representation members 326–332 in FIGS. 12 and 13. A similar plurality of link arms forming a zig-zag path connect the pivotation axes of the second terminal links 310, 312 on the second transporter representation members 330, 332 respectively, and such path has similarily been shown in solid lines for the reference positions of the ternary links 236, 238, the terminal links 306–312 and the transporter representation members 326–332 in FIGS. 12 and 13. (FIGS. 12 and 13 have been drawn to show the link arms from a viewpoint above the linkage assembly 234 and corresponds to the view of the transporter pivotation initiating assembly 192 in (FIG. 6.) In FIGS. 12 and 13, link arms provided by the intermediate links and the terminal links have been designated by the numerals used to designate the intermediate links and terminal links in FIG. 7. Link arms formed by portions of the first ternary link 236 between the axis of pivotation thereof on the case 198 and the two first intermediate links 298, 300 have been designed 402 and 404 respectively and link arms formed by portions of the second ternary link 238 between the axis of pivotation thereof on the case 198 and the two second intermediate links 302, 304 have been designated 406 and 408 respectively. Also shown in FIGS. 12 and 13 are arms between the shafts of the valves 360-366 and the pivotation axes of the transporter representation members 326-332 on the case 198, such arms being designated 410-416 for the transporter representation members 326-332 respectively. (For clarity of illustration, linkages formed by the arm 266 connected the lug 222 to the first ternary 236 and the cross-arm 282, interconnecting the ternary links 236, 238, have not been shown in FIGS. 12 and 13.) In addition to showing the form of the linkage assembly 234 for the reference positions of the ternary links 236, 238, the terminal links 306-312 312 and the transporter representation members 326-332, FIGS. 12 and 13 further show the form of the linkage assembly 234 for two additional cases. In FIG. 12, the form of the linkage assembly 234 is shown in dashed lines for the case wherein the ternary links 236, 238 have been pivoted in the first directions of pivotation 288, 290 thereof from the reference positions thereof while the transporter representation members 326-332 are in the reference positions thereof on the case 198. (For clarity of illustration, pivotations of the terminal links 306-312 in FIG. 12 have been exaggerated. It will be clear from the above description of the terminal link 306 that the pin 394 engaging the arcuate slot 392 in the cover 388 of the valve 360 will prevent the terminal link 306 from pivoting through the angle shown in FIG. 12 and similar limitations are imposed on the terminal links 308-312. It will also be clear, from the following, that such limitations on the pivotation of the terminal links 306-312 will not limit the operation of the transporter pivotation initiation assembly 190.) Dashed lines in FIG. 13 show the form of the linkage assembly 234 for the case wherein the ternary links 236, 238 have been pivoted in the first directions of pivotation 288, 290 thereof from the reference positions thereof while the terminal links 306-312 are in the reference positions thereof on the transporter representation members 326-332.

As will be clear from FIG. 12, a pivotation of the ternary links 236, 238 in the first directions of pivotation 288, 290 thereof from the reference positions thereof at such times that the transporter representation members 326-332 are in the reference positions thereof establishes a pattern of pivotations of the terminal links 306-312 from the reference positions thereof on the transporter representation members 326-332. Such pattern of pivotation of the terminal links 306-312, referred to herein as a first pattern of pivotation of the terminal links 306-312, is defined by the totality of pivotations of the terminal links 306-312 in response to pivotations of the ternary links 236, 238 in the first directions of pivotations 288, 290 thereof and will be characterized below in terms of each terminal link 306-312 pivoting in a selected one of a first direction and a second direction defined with respect to the transporter representation member 326-332 whereon such terminal link 306-312 is mounted and defined by means of selection rules to be discussed below. Similarly, pivotations of the ternary links 236, 238 in the second directions of pivotation 292, 294 thereof define a second pattern of pivotation (not shown) for the terminal links 306-312 wherein the terminal links 306-312 are pivoted in directions opposite to the directions of pivotation thereof in the first pattern of pivotation of the terminal links 306-312.

As will be clear to those skilled in the art, the angles through which the first terminal links 306, 308 pivot in response to a specific angle of pivotation of the first ternary link 236, for the case wherein the first transporter representation members 326 and 328 are in the reference positions thereof, need not be equal and, similarly, the second terminal links 310, 312 need not undergo equal pivotations in response to a pivotation of the second ternary link 238 at such times that the second transporter representation members 330 and 332 are in the reference positions thereof. Rather, the relative magnitudes of pivotations of the first terminal links 306, 308 and of the second terminal links 310, 312 for a specific pivotation of the ternary links 236, 238 can be adjusted by selecting the lengths of the link arms of the linkage assembly 234 and the lengths of the arms 410-416 shown in FIGS. 12 and 13. Such adjustment will be discussed below.

However, the symmetry of the linkage subassemblies 407, 409 and the symmetrical placement of the transporter representation members 326-332 with respect to the ternary links 236, 238 establishes relationships between angles of pivotation of the terminal links 306-312 which are used in the steering of the construction machine 30 and these relationships will now be discussed with reference to FIG. 12. As will be clear from the above description of the structure of the linkage assembly 234, a pivotation of the first ternary link 236 in the first direction 288 thereof through a specific angle such as the angle 418 in FIG. 12 results in a pivotation of the second ternary link 238 in the first direction of pivotation 290 thereof by an equal amount. That is, the second ternary link also pivots through an angle equal to the angle 418 as has been indicated in FIG. 12 via the designation of the angle of pivotation of the second ternary link 238, for a pivotation of the first ternary link 236 through the angle 418, by the same reference numeral 418. The effect of these pivotations is to pull the first terminal link 306 and the second terminal link 312 from the reference positions thereof and the symmetry of construction of the linkage subassemblies 407 and 409 requires that the angles through which the terminal links 306 and 312 pivot be identical as has been shown in FIG. 12 by designating such angles by the same reference numeral 420. Similarly, first terminal link 308 and second terminal link 310 are pushed from the reference positions thereof by equal amounts when the ternary links 236, 238 are pivoted in the first directions thereof as has been indicated by the angles designated 422 in FIG. 12. Should the ternary links 236, 238 be pivoted by an angle equal to the angle 418 in the second directions of pivotation thereof, two reversals in the pivotations of the terminal links 306-312 will occur. The terminal links 306 and 312 will in such case be pushed from the reference positions while the terminal links 308 and 310 will be pulled from the reference positions thereof so that the directions of pivotation of the terminal links 306-312 will be reversed. Similarly, the relative magnitudes of the angles through which the first terminal links 306 and 308 and the relative magnitudes of the angles through which the second terminal links 310 and 312 are pivoted is reversed. That is, for pivotations of the ternary links 236, 238 through an angle equal to the angle 418, the terminal links 306 and 312 will be pivoted through angles equal to the angles 422 while the terminal links 308 and 310 will be pivoted through angles equal to the angle 420. (The reversal in magnitudes of the angles of pivotation of the terminal links from the first pattern of pivotations to the second pattern of pivotations follows from the symmetry of the linkage subassemblies 407, 409 about a line connecting the pivotation axes of the ternary links 236, 238 so that the form of second pattern of pivotations of the terminal links 306-312 can be generated from FIG. 12 by reflecting the dashed lines therein through a line connecting the points 424, 426 which represent the pivotation axes of the ternary links 236, 238 on the case 198.)

The relationship between the angles through which the first terminal links 306, 308 are pivoted and the corresponding relationship between angles of pivotation for the second terminal links 310, 312 is selected in a manner which will now be discussed with reference to FIGS. 13 and 14. Initially, it will be noted that the structure of the first linkage subassembly 407 (and of the second linkage subassembly 409) and the placement of the first transporter representation members 326, 328 (and of the second transporter representation members 330, 332) will establish a fixed relationship between relative pivotations of the first terminal links 306, 308 (and of the second terminal links 310, 312) at such times that the ternary links 236, 238 are pivoted while the transporter representation members 326-332 remain in place and relative pivotations of the first transporter representation members 326, 328 (and of the second transporter representation members 330, 332) at such times that the ternary links 236, 238 are pivoted while the terminal links 306-312 remain in the reference positions thereof on the transporter representation members 326-332. That is, a fixed relationship exists between the relative magnitudes of the angles 420, 422 in FIG. 12 and the relative magnitudes of the angles which have been designated 428 and 430 in FIG. 13. (The same symmetry considerations that require the identity of the angles of pivotation of the first terminal link 306 and second terminal link 312 and require the identity of the angles of pivotation of first terminal link 308 and second terminal link 310 in FIG. 12 also require the identity of the angles of pivotation of first transporter representation member 326 and second transporter representation member 332, as represented by the pivotation of arms 410 and 416 of FIG. 13, and the identity of the angles of pivotation of first transporter representation member 328 and second transporter representation member 330, as represented by pivotation of the arms 412 and 414 in FIG. 13 for the case, shown in FIG. 13, wherein the transporter representation members 326-332 rather than the terminal links 306-312 are displaced from the reference positions thereof in response to a pivotation of the ternary links 236, 238.)

Figure 14:
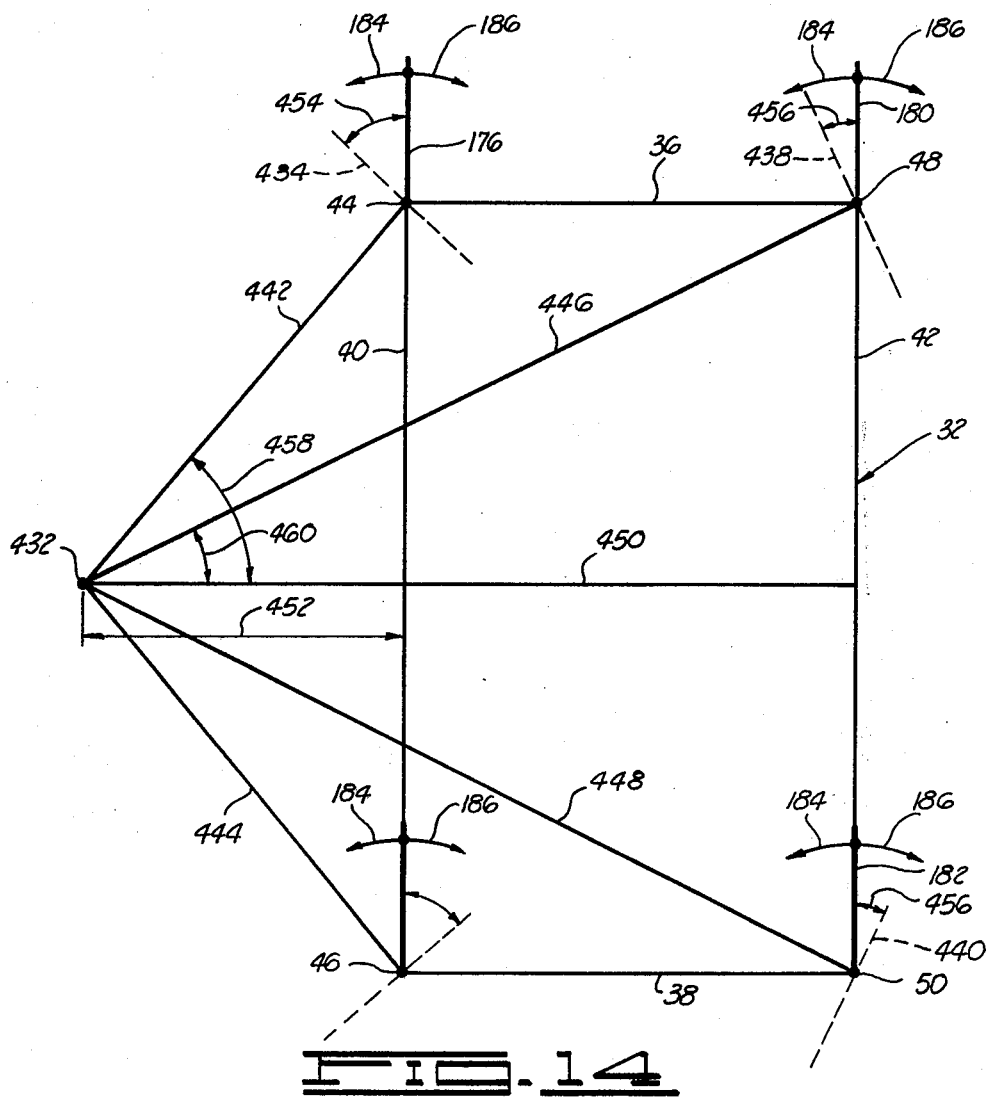
FIG. 14 is a schematic representation of the chassis of the construction machine showing a preferred mode of steering thereof.

The lengths of the link arms of the linkage subassemblies 407, 409 are selected such that the relationship between the angles 428, 430 in FIG. 13 approximates a relationship between angles which will now be defined with reference to FIG. 14. FIG. 14 is a schematic representation of the chassis 32 wherein the chassis 32 is represented by a rectangle, designated 32 in FIG. 14, having vertices located at the pivotation of axes of the transporters 44-50 and designated by the reference numerals 44-50. The sides and ends of the chassis 32 in FIG. 3 correspond generally to the sides and ends of the rectangle 32 in FIG. 14 and the sides and ends of the rectangle 32 in FIG. 14 have been designated by the numerals used for designating the sides and ends of the chassis 32 in FIG. 3. In order to discuss the preferred mode of steering of machine 30, lines corresponding to the reference lines 176-182 for the transporters 44-50, such lines being shown in FIG. 5, have been drawn on the rectangle in FIG. 14 and designated by the reference numerals corresponding to the reference lines 176-182 in FIG. 5. Similarly, the directions of pivotation 184, 186 of the transporter representation members 44-50 have been indicated in FIG. 14 and designated by the reference numerals used therefor in FIG. 5.

As will be clear to those skilled in the art, the chassis 32 can be caused to turn in a circle about a selected turning center disposed to one side of the chassis 32 by pivoting the totality of transporters 44-50 in a pattern which has been shown for the case wherein the turning center, designated 432 in FIG. 14, is disposed on the first side of the chassis 32. For turning the chassis 32 about the center 432, the dashed lines designated 434-440 in FIG. 13, along which the ground engagement members of the transporters 44-50 roll to accomplish the turn, are positioned perpendicularly to lines, designated 442-448 in FIG. 14, which extend from the pivotation axes of the transporters 44-50 and converge at turning center 432. In the preferred practice of the present invention, turning centers for the chassis 32 are selected to shift along a line, 450 in FIG. 14, which longitudinally bisects the rectangle 32 and such selection establishes relationships between the angles through which the transporters 44-50 are pivoted to effect a turn in a circle about a selected turning center. These relationships are embodied in the linkage 234 for steering the machine 30. The selection of the turning center to lie along the line 450 qualitatively requires that transporters on the same side of the chassis 32 be canted through the same angle and that transporters on opposite sides of the chassis be canted by different amounts as has been shown in FIG. 14 wherein the transporters 44 and 46 are pivoted through the angle 454 and transporters 48 and 50 are pivoted through a smaller angle 456 to produce a turning center 432 displaced a selected distance 452 from a line connecting the pivotation axes of the transporters 44 and 46 on the first side 40 of the chassis 32. Quantitatively, the angle 456 is related to the angle 454 via the identity of the angles 456 and 454 to the angles 458 and 460 respectively shown in FIG. 14. Thus, simple trigonometric relationships between the distance 452 and the positioning of the transporters 44-50 on the chassis 32 define the angles 454 and 456 for selected values of the distance 452. These relationships are embodied in the linkage assembly 234 via the symmetries thereof described above and by selecting the lengths of the link arms. Specifically, the length of the link arms are selected such that the relationship between the angles 430 and 428 in FIG. 13 is approximately the same as the relationship between the angles 458 and 460 in FIG. 14. Such approximation can be carried out via well-known graphical techniques and it has been found that for the case wherein the distance between the pivotation axes of transporter 44 and 46 is 10 feet and the distance between the pivotation axes of the transporters 44 and 48 is 76 inches, suitable lengths for the arms 404, 300, 308 and 412 respectively are 2.653 inches, 4.223 inches, 1.500 inches and 1.365 inches when the pivotation axes of the transporter representation members 326-332 are displaced to the side of the line connecting the points 424, 426 in FIG. 13 by a distance of 4.750 inches, when the distance between the centers of the transporters representation members on one of the representation member mounting plates is 7.250 inches, and when the separation between the pivotation axes of the ternary links 236, 238 on the case 198 is 10 inches. With such structure of the linkage assembly 234, the angle 428 will vary from the angle 460 by less than 1.5 degrees for equal values of up to 72 degrees for the angles 458 and 430. In FIG. 14, the value 72 degrees for the angle 458 corresponds to a value of approximately 18.75 inches for the distance 452 with the above described separations of the transporters 44 and 46 and of the transporters 44 and 48. The equality of the two angles designated 454 and of the two angles designated 456 in FIG. 14 is embodied in the linkage assembly 234 by the equality of the two angles designated 430 and of the two angles designated 428 respectively in FIG. 13.

Should the turning center for the chassis 32 be shifted to the second side 42 thereof, the relative magnitudes of the pivotation of the transporters on opposite sides of the chassis 32 is reversed. That is, the transporters 48, 50 pivot through greater angles than do the transporters 44, 46 for such a case. This relationship is embodied in the linkage assembly 234 by the mirror symmetry of the linkage subassemblies 407, 409 about a line between the points 424 and 426. In the same manner that a reversal occurs in the relative magnitudes of the angles 420 and 422 in FIG. 12 for first and second patterns of pivotations of the linkage assembly 234, a reversal in the relative magnitudes of the angles of pivotation of the arms 410 and 412 in FIG. 13 occurs when the ternary links 236, 238 are pivoted in the second directions of pivotation thereof rather than in the first directions of pivotation as shown in FIG. 13.

As shown in FIG. 14, the transporters 46 and 50 near the rear end 38 of the chassis 32 are pivoted in the second direction 186 when the transporters 44, 48 are pivoted in the first direction 184 to effect a turn about a turning center, such as the turning center 432, disposed on the first side 40 of the chassis 32. Similarly, for a turn about a turning center disposed on the second side 42 of the chassis 32, the transporters 44, 48 are pivoted in the second direction 186 while the transporters 46, 50 are pivoted in the first direction 184. This relationship, that the transporters 46, 50 near the rear end 38 of the chassis 32 be pivoted in a direction opposed to the direction of pivotation of the transporters 44, 48 near the forward end 36 of the chassis, is embodied in the linkage assembly 234 by connecting the valves 360–366 to the rams 148, 164–168 in accordance with selection rules which will now be described.

Referring again to FIG. 12, it will be noted that a pivotation of the ternary links 236, 238, as represented in FIG. 12 by the link arms 402, 404 (first ternary link 236) and the link arms 406, 408 (second ternary link 238), in the first directions 288, 290 of pivotation thereof from the reference positions thereof so as to establish a first pattern of pivotations of the terminal links 306–312 will pivot one of the first terminal links 306, 308 and one of the second terminal links 310, 312 through greater angles from the reference positions thereof than such pivotation of the ternary links 236, 238 will pivot the other of the first terminal links 306, 308 and the other of the second terminal links 310, 312 from the reference positions thereof. The valves connected to the terminal links pivoted through the greater angles from the reference positions thereof via pivotation of the ternary links 236, 238 in the first directions 288, 290 of pivotation thereof are connected to the rams 148, 164 which, in turn, are connected to the transporters 44, 46 on the first side 40 of the chassis 32. This selection rule has been exemplified in FIGS. 5, 7 and 12. As shown in FIG. 12, a first pattern of pivotation of the terminal links pivots the first terminal link 308 and the second terminal link 310 through greater angles than the first terminal link 306 and the second terminal link 312. As shown in FIG. 7, the terminal links 308 and 310 are mounted on the valves 362 and 364 respectively, and, as shown in FIG. 5, the valves 362 and 364, are connected to rams 148 and 164, respectively, which position transporters 44 and 46 on the first side 40 of the chassis 32. Similarly, as is also shown in FIG. 5, valves 360 and 366, connected to terminal links 306 and 312 (FIG. 7), such terminal links undergoing the greater angle of pivotation in response to pivotations of the ternary links 236, 238 in the second direction 292, 294 of pivotation of the ternary links 236, 238, are connected to rams 166 and 168 respectively, such rams being in turn connected to the transporters 48 and 50 respectively, disposed on the second side 42 of the chassis 32.

The selection of which of the valves 362, 364 is to be connected to the ram 148 and which is to be connected to the ram 164 can be made arbitrarily. That is, the connection of valve 362 to ram 148 in FIG. 5 and the connection of valve 364 to ram 164 is by way of example and not of limitation. Similarly, the connection of valve 360 to ram 166 and of valve 366 to ram 168 is by way of example and not of limitation. However, the connection of a specific valve to a specific ram establishes a series of correspondences which are utilized in a manner that will become clear below. The connection of a specific valve to a specific ram establishes a correspondence between each valve and a specific transporter via the above noted correspondence between the rams and the transporters. That is, the valve corresponding to a specific transporter is the valve connected to the ram which can be utilized to pivot such transporter. Similarly, the terminal link connected to the valve member of a valve corresponding to a specific transporter will be referred to herein as corresponding to such specific transporter and the transporter representation member where is mounted a valve corresponding to a specific transporter will be referred to herein as corresponding to such specific transporter.

As noted above, the sense of hydraulic pressure a valve 360–366 supplies to a ram 148, 164–168 when the valve member thereof is pivoted in a specific direction from the block-center position thereof can be selected by the selection of which of two conduits connected to the ram to conduct hydraulic fluid between the ram and the valve is connected to each of the outlet ports of the valve. In order to provide the construction machine 30 with the mode of steering shown in FIG. 14, a selection rule is utilized in connecting the valves to the rams. Specifically, the valves connected to rams corresponding to transporters 44, 48 near the forward end 36 of the chassis 32, are connected to such rams so as to provide a first sense of hydraulic pressure thereto in response to pivotations of the ternary links 236, 238 in the first directions 288, 290 of pivotation thereof and the valves connected to rams corresponding to transporters 46, 50 near the rear end 38 of the chassis 32 are connected to such rams so as to provide a second sense of hydraulic pressure thereto in response to a pivotation of the ternary links 236, 238 in the first directions 288, 290 of pivotation thereof. Referring once again to FIG. 5, wherein the hydraulic circuit shown therein is drawn to exemplify the selection rule for corresponding the valves 360–366 to the rams 148, 164–168, such hydraulic circuit has also been drawn to exemplify the present selection rule as will now be discussed.

In FIG. 5, the schematic representations of the valves 360–366 have been drawn such that the lower sections of such representations indicate the hydraulic circuit formed by pivoting the ternary links 236, 238 in the first directions 288, 290 of pivotation thereof so as to pivot the valve members of the valves 360-366 from the blocked-center positions thereof and the upper sections indicated the hydraulic circuit resulting from pivoting the ternary links 236, 238 in the second directions 292, 294. As shown in FIG. 5, the pivotation of the ternary links 236, 238 in the first directions 288, 290 extends the piston of ram 164 (to pivot transporter 44 connected to feedback sheave 152 in the first direction 184), retracts the piston of ram 148 (to pivot transporter 46 connected to feedback sheave 122 in the second direction 186), retracts the piston of a ram 166 (to pivot transporter 48 connected to feedback sheave 154 in the first direction 184) and extends the piston of ram 168 (to pivot transporter 50 connected to feedback sheave 156 in the second direction 186). That is, rams 164, 166 connected to transportation 44, 48 near the forward end 36 of the chassis 32 are supplied with a first sense of hydraulic pressure to pivot the transporters 44, 48 in the first direction 184 and rams 148, 168 connected to transporters 46, 50 near the rear end 38 of the chassis 32 are supplied with the second sense of hydraulic pressure to pivot the transporters 46, 50 in the second direction 186. Accordingly, the transporters 44-50 are pivoted in directions required to establish a turning center on the first side 40 of the chassis 32 via a pivotation of the ternary links 236, 238 in the first directions 288, 290 respectively thereof. Similarly, a pivotation of the ternary links 236, 238 in the second directions 292, 294 will provide a second sense of hydraulic pressure to each of the rams 164, 166 connected to the transporters 44, 48 near the forward end 36 of the chassis 32 so as to pivot the transporters 44, 48 in the second direction 186 while supplying a first sense of hydraulic pressure to the rams 148, 168 so as to pivot the transporters 46, 50 near the rear end 38 of the chasses 32 in the first direction 184. That is, a pivotation of the tenary links 236, 238 in the second directions 292, 294 will pivot the transporters 44-50 in the directions required to establish a turning center on the second side of the chassis 32.

As will be clear from the above discussion of FIG. 14, the establishment of a turning center involves the magnitudes of the angles through which the transporters 44-50 are pivoted as well as the directions in which the transporters 44-50 are pivoted. In order to limit the angle through which each transporter 44-50 is pivoted so as to establish a turning center to one side of the chassis 32, the present invention includes a feedback assembly 470, shown in FIG. 15 and FIGS. 5-8, connecting each transporter 44-50 to the corresponding transporter representation member 326-332. In order to facilitate a discussion of the feedback assembly 470, it is useful to first establish a convention for describing the directions of pivotations of the terminal links 306-312 in relation to pivotations of the transporters 44-50 in the directions 184, 186. A first direction of pivotation of a terminal link 306-312 on a transporter representation member 326-332, as such term is used herein, means that direction of pivotation which will cause the valve to which such terminal link is connected to provide a first sense of hydraulic pressure to the ram to which such valve is connected; that is, to cause the transporter corresponding to the terminal link to pivot in the first direction 184 via the requisite extension or retraction of the piston rod of the ram corresponding to such transporter. A second direction of pivotation of a terminal link 306-312 similarly causes a pivotation of the corresponding transporter 44-50 in the second direction 186. For the example of correspondences between the valves 360-366 and the transporters 44-50 shown in FIG. 5, the first direction of pivotation of the terminal links 306-312 have been indicated in FIG. 12 and identified by the common reference numeral 472 and the second directions of pivotation of the terminal links 306-312 have been similarly identified by the common reference numeral 474 in FIG. 12. Corresponding to a first direction 472 of pivotation of a terminal link 306-312 on a transporter representation member 326-332, each transporter representation member 326-332 has a first direction of pivotation 476 and a second direction of pivotation 478 on the case 198 and such directions are shown in FIG. 13 via direction arrows on the arms 410-416 which are disposed along lines between the axes of pivotation of the transporter representation members 326-332 and the shafts on the valve members of the valves 360-362 as previously discussed. As shown in FIGS. 12 and 13, the first direction of pivotation of a transporter representation member 326-332 is the direction wherein the transporter representation member 326-332 is pivoted to return the corresponding terminal link 306-312 to the reference position thereof on such transporter representation member 326-332 where a pivotation of the ternary links 236, 238 has caused such corresponding terminal link 306-312 to pivot in the first direction 472 at such times that the transporter representation members 326-332 have remained in fixed positions. That is, where a pivotation of the ternary links 236, 238 will pivot a specific terminal link from the reference position thereof in the first direction 472, a pivotation of the corresponding transporter representation member in the first direction 476 returns such terminal link to the reference position thereof. The directions 476, 478 of pivotation of the transporter representation member 328 have also been shown in dashed lines in FIG. 6.

The feedback assembly 470 includes the feedback sheaves 122, 152-156 and the construction of the feedback sheaves is shown in FIG. 5 for the feedback sheave 122. The feedback sheave 122 is formed of plate metal in two semicircular portions 480 and 482 which join along a common diameter 484. Notches, 486, 488, formed in the portions 480, 482 respectively along the diameter 484, coact to form a square hole in the center of the feedback sheave 122 to permit the support shaft 132 of transporter 46 to pass through the feedback sheave 122. A groove 490 is formed circumferentially about the outer periphery of the feedback sheave 122 on a radius 492 and such radius is selected to be twice that of the radius 356 of the grooves 353 and 355 in the circumferential peripheries of the transporter representation members 326-332 (FIG. 8) for a purpose which will become clear below. The feedback sheaves 152-156 are constructed in the same manner as the feedback sheave 122.

Referring now to FIG. 15, shown therein are portions of the base beams 194, 196 between the transporters 44-50 as the base beams 194, 196 would be seen from above the chassis 32 with the forward end of the chassis 32 to the left of the drawing. Portions of the feedback assembly 470 are disposed between the base beams 194, 196 and such portions include cables which extend to the transporter pivotation initiating assembly 192 in a manner to be discussed with particular reference to FIG. 6. In order to more clearly show the extension of these cables to the transporter pivotation initiating assembly 192, FIG. 6 has been placed below FIG. 15 and portions of the feedback assembly 470 shown in FIG. 15 have been drawn on an expanded scale, with respect to the forward-to-rear extent of the chassis 32, so as to generally align portions of these cables shown in FIG. 15 with remaining portions thereof shown in FIG. 6.

The feedback assembly 470 comprises four feedback subassemblies 494-500, each of which connects a specific feedback sheave 122, 152-156, connected to a specific transporter 44-50, to the specific transporter representation member 326-332 corresponding to such specific transporter 44-50. Thus, each feedback assembly corresponds to a specific one of the transporters 44-50. The feedback subassemblies 494-500 have common structure so that it will suffice for purposes of the present disclosure to describe one of the feedback subassemblies 494-500 in detail, point out corresponding features of the other feedback subassemblies 494-500 and describe the system whereby the feedback subassemblies 494-500 connect the feedback sheaves 122, 152-156 to the transporter representation members 326-332.

The feedback subassembly 496, which connects the feedback sheave 122 mounted on the transporter 46 to the transporter representation member 328, in correspondence with the transporter 46, comprises a pulley 502 having a sheave mount 504 and a sheave 506 pivotally mounted at one end of the sheave mount 504. A first feedback cable 508 has one end secured to the periphery of the feedback sheave 122 by a suitable clamp (not shown) and portions of the first feedback cable 508 near such end thereof are disposed in the circumferential groove 490 (FIG. 5) formed in the periphery of the feedback sheave 122, such portions of the first feedback cable 508 extending about a portion of the feedback sheave 122. It is convenient to attach the first feedback cable 508 to the feedback sheave 122 such that portions of the first feedback cable 508 extend substantially in a semicircular arc about the support shaft 132 of the transporter 46 at such times that the ground engagement member 140 of the transporter 46 is positioned to roll along reference line 178 and such that the first feedback cable 508 is taken up by the feedback sheave 122 in response to a pivotation of the transporter 46 in the first direction 184 and is paid out therefrom in response to a pivotation of the transporter 46 in the second direction 186. For this purpose, the common diameter 484 of the two portions 480, 482 of the feedback sheave 122 is aligned with the reference line 178 of the transporter 46, with the portion 482 of the feedback sheave 122 adjacent the first base beam 194, when the ground engagement member 140 is positioned to roll along line 178. The end of the first feedback cable 508 attached to the feedback sheave 122 is then attached thereto at substantially the center of the circular portion of the periphery of the semicircular portion 482 of the feedback sheave 122 and extends along rear portions of the feedback sheave 122 to substantially the center of the semicircular portion 480 of the feedback sheave 122. From the feedback sheave 122, the first feedback cable 508 extends over the first base beam 194 to the pulley 502 and is looped about the sheave 506 thereof. The other end of the first feedback cable 507 is then secured to the first base beam 194 by any suitable means. The pulley 502 is aligned with the transporter pivotation initiating assembly 192 in a manner which has been indicated in the relative positioning of FIGS. 15 and 6 and the above described forward-to-rear expansion of the feedback assembly 470, such alignment to be presently discussed, and a sheave 510 is mounted in any suitable manner on the chassis 32 to position intermediate portions of the first feedback cable 508 so as to align the first feedback cable 508 both with the feedback sheave 122 and the pulley 502 for routing the first feedback cable 508 in the manner described.

The feedback subassembly 496 further comprises a sheave 512 mounted on the second base beam 196 and generally aligned with the sheave 510 and the pulley 502. A second feedback cable 514 is secured at one end thereof to the sheave mount 504, via a turnbuckle 516, and the other end of the second feedback cable 514 is attached to one end of a spring 518 which is secured, at the other end thereof, to the second base beam 196. Intermediate portions of the second feedback cable 514 are routed to, and looped about the transporter representation member which corresponds to the transporter 46 whereon the feedback sheave 122 is mounted. (The feedback assembly 470 has been drawn in FIG. 15, and in FIG. 6, so as to be consistent with the correspondences between the transporters, the rams and the valves shown in FIG. 5. For the exemplary connection shown in FIG. 5, the valve 362 is mounted on the transporter representation member 328 so that the feedback subassembly 496, which corresponds to the transporter 46 via the connection of the first feedback cable 504 to the feedback sheave 122, is looped about the transporter representation member 328 which similarly corresponds to the transporter 46).

Referring now to FIG. 6, shown therein is the manner wherein the second feedback cable 514 is looped about the transporter representation member 328. As noted above, portions of cables extending from between the base beams 194, 196, as shown in FIG. 15, to the transporter pivotation initiating assembly 192 are aligned with remaining portions of such cables shown in FIG. 6 and portions of the second feedback cable 514 near the upper portion of FIG. 6 have been designated with the reference numeral 514 to more clearly show such alignment. In order to loop the second feedback cable 514 about the transporter representation member 328, sheaves 520, 522 (FIG. 7) are mounted on the flange 214 at the lower edge of the inner side wall 204 to route the sides of the loop formed by the second feedback cable 514 under the case 198 of the transporter pivotation initiating assembly 192. Sheaves 524, 526 (FIG. 7) are mounted on two of the ribs 218, near the lower ends thereof, on the outer sidewall 206 to route the second feedback cable 514 along the outer sidewall 206. Sheaves 528, 530 (FIG. 6) near the upper ends of the ribs 218 whereon are mounted the sheaves 524, 526 route the second feedback cable 514 through an aperture 525 (FIG. 8) in the outer side wall 206 to the transporter representation member 328 whereon the second feedback cable 514 is looped to extend through a portion of the groove 353 in the outer periphery of the transporter representation member 328 as shown in FIG. 6.

As shown in FIGS. 6 and 7, the ribs 218 whereon the sheaves 524-530 are mounted are aligned with diametrically opposed edges of the transporter representation member 328. The sheaves 520 and 522 on flange 214 are similarly aligned with the transporter representation member 328 and such alignment is used to position those portions of the feedback subassembly 496, shown in FIG. 15, disposed between the base beams 194, 196 of the cahssis 32. The second feedback cable 514 thus has the general form of the letter U folded to extend along three sides of the case 198 of the transporter pivotation initiating assembly 192 with the base of the U extending along the groove 353 and the sheave 520–530 are positioned to maintain such form of the second feedback cable 514. It will be noted that such configuration of the second feedback cable 514, the placement of the transporter representation members 328 and 332 on the case 198, and the placement of the groove 353 in the transporter representation member 328 causes the second feedback cable 514 to pass thrugh the groove 358 in the transporter representation member 332 and the groove 358 is formed for the purpose of preventing interference between the second feedback cable 514 and the transporter representation member 332 while permitting the groove 353 in the transporter representation member 328 and the groove 355 (FIG. 8) in the transporter representation member 332 to have equal diameters.

As will be clear from the above description of the feedback subassembly 496, the spring 518 will provide tension in the feedback cables 508, 514 such that a pivotation of the transporter 46 and, accordingly of the feedback sheave 122, will be accompanied by a pivotation of the transporter representation member 328. (A suitable clamp, not shown, can be mounted on the transporter representation member 328 to engage the second feedback cable 514 and prevent slippage thereof in the groove 353.)

Moreover, the structure of the feedback subassembly 496 and the manner in which the feedback cables 508 and 514 are connected to the feedback sheave 122 and the transporter representation member 328 respectively establish a fixed relationship between the pivotation of the transporter 46 and the pivotation of the transporter representation member 328, both as regards the magnitude of such pivotations and the directions thereof. Referring first to the relative magnitudes of such pivotations, a pivotation of the transporter 46, to pivot the feedback sheave 122, such that the first feedback cable 508 is paid out or taken up by the feedback sheave 122 will result in a shift in position of the pulley 502 by an amount equal to one half of the length of the first feedback cable 508 which is paid out or taken up by the feedback sheave 122. That is, the shift in position of the pulley 502 is one half the product of the radius of the groove 490 in the feedback sheave 122 and the angle of pivotation (in radian measure) of the transporter 46. Thus, a length of the second feedback cable 514 equal to one half the product of the diameter of the groove 490 in the feedback sheave 122 and the angle of pivotation of transporter 46 will roll on transporter representation member 328 to pivot the transporter representation member 328. Since the radius of the groove 353 in transporter representation member 328 is one half the radius of groove 490, the angle of pivotation of transporter representation member 328, found by dividing the shift in position of pulley 502 by the radius of groove 353, is equal to the angle of pivotation of transporter 46. (That is, the result of dividing one half the product of a given radius and a given angle by one half the given radius is the given angle.)

For purpose of relating the direction of pivotation of transporter representation member 328 to the direction of pivotation of the transporter 46, the arm 412 of FIG. 13, between the center of transporter representation member 328 and the valve member of valve 362 mounted on such transporter representation member, and the first and second directions 476, 478 of pivotation of the transporter representation member 328, shown in FIG. 31, have been drawn in dashed lines on the transporter representation member 328 in FIG. 6. With the first feedback cable 508 connected to the feedback sheave 122 as shown in FIG. 15 and as described above, a pivotation of the transporter 46 in the first direction 184 will result in an additional portion of the first feedback cable 508 being taken up by the feedback sheave 122 so as to draw the pulley 502 toward the first base beam 194. The movement of pulley 502 draws portions of the second feedback cable 514 passing over the sheave 528 in FIG. 6 away from the transporter representation member 328 so that transporter representation 328 is pivoted in first direction 476 thereof on the case 198. Thus, the feedback subassembly 496 pivots the transporter representation member 328 in response to a pivotation of the transporter 46 to which the transporter representation member 328 corresponds in accordance with a rule as follows: the angle of the pivotation of the transporter representation member 328 is the same as the angle of the pivotation of the transporter 46 and a pivotation of the transporter 46 in the first direction 184, as first and second directions of pivotation have been defined therefor, results in a pivotation of the transporter representation member 328 in the first direction thereof, as first and second directions of pivotation have been defined for the transporter representation member 328.

As shown in FIGS. 15 and 6, the remaining feedback subassemblies 494, 498, and 500 respectively similarly comprise: pulleys 532–536 respectively having sheaves 538–542 respectively; first feedback cables 544–548 which are attached at one end to base beams 194, 196, and 196 respectively, pass over the sheaves 538–542 respectively, and are routed to and attached to the feedback sheaves 152–156 respectively; and second feedback cables 550–554 respectively, which are attached at one end of each thereof to the pulleys 532–536 respectively and are each attached at the other ends thereof to springs 556–560 respectively. The other ends of the springs 556–560 are each secured to the base beam 196 and intermediate portions of the second feedback cables 550–554 are looped about the transporter representation members 330, 326 and 332 respectively, to pivot the transporter representation members 330, 326, and 332 respectively, in response to pivotations of the transporters 44, 48 and 50 respectively.

The second feedback cable 552 is routed to the transporter representation member 326 in the same manner that the second feedback cable 514 is routed to the transporter representation member 328; that is, via sheaves 562 and 564 (FIG. 7) on the flange 214 and via sheaves 566, 568 (FIG. 7) and sheaves 570, 572 (FIG. 6) on two of the ribs 218 on the outer side wall 206 of the case 198. A variation in such routing is utilized for second feedback cables 550 and 554 to prevent crossing and possible entanglement of portions of different feedback subassemblies 494–500. As shown in FIG. 15, the spring 556 and pulley 532 of feedback subassembly 494 are positioned between the spring 558 and the pulley 534 of feedback subassembly 498 and sheaves 574, 576 (FIG. 7) on the flange 214, sheaves 578, 580 (FIG. 7) and sheaves 582, 584 (FIG. 6) mounted on two of the ribs 218 between the ribs 218 whereon the sheaves 566–572 are mounted, maintain portions of the second feedback cable 550 on opposite sides of the transporter representation member 330 in a parallel arrangement to the top of the outer side wall 206 of the case 198.

Sheaves 573 and 575 (FIG. 6) mounted on the flange 216 guide the second feedback cable 550 into the groove (not shown) formed in the periphery of the transporter representation member 330. The spring 560 and pulley 542 of feedback subassembly 500 are similarly disposed between the spring 518 and pulley 502 of feedback subassembly 496 and sheaves 577, 579 (FIG. 7) on flange 214, sheaves 581, 583 (FIG. 7) and sheaves 586, 588 (FIG. 6) on two of the ribs 218 between ribs 218 whereon the sheaves 524-530 are mounted, and sheaves 594, 596 (FIG. 6) on the flange 216 route the second feedback cable 554 to the transporter representation member 332. As in the case of the second feedback cable 514, second feedback cables 550-554 enter the case 198 via the aperture 525 (FIG. 8) formed in the outer side wall 206 of the case 198.

The above described rule for the relative magnitude and direction of a pivotation of the transporter representation member 328 in response to a pivotation of the transporter 46 applies to the transporter representation member 326, 330 and 332. That is, a pivotation of any transporter 44-50 causes a pivotation of equal magnitude of the transporter representation member 326-332 corresponding thereto and a pivotation of a transporter 44-50 in the first direction 184, as directions of pivotation have been defined for the transporters 44-50, causes a pivotation of the transporter representation member 326-332 corresponding thereto in the first direction 476, as directions of pivotation have been defined for the transporter representation members 326-332 above. As will be clear to those skilled in the art, the rule as regards the relative directions of pivotation of transporters 44-50 and transporter representation members 326-332 can be selected by the manner wherein the first feedback cables 508, 544-548 are wrapped on the feedback sheaves 122, 152-156 respectively. As noted above, at such times that the transporter 46 is aligned with the reference direction 178, the first feedback cable 508 is secured to the feedback sheave 122 adjacent the first base beam 194 of the chassis 32 and extends about the rear of the feedback sheave 122. With the routing of the second feedback cable 514 to the transporter representation member 328 as has been described above, such attachment of the first feedback cable 508 results in the relative direction of pivotation rule recited above for the transporter 46 and the transporter representation member 328. Similarly, such relative direction of pivotation rule for the feedback subassemblies 494, 498 and 500 is achieved by the manner wherein the first feedback cables 544, 546 and 548 are attached to the feedback sheaves 152, 154 and 156. Specifically, the first feedback cable 548 is attached to the feedback sheave 156 at a point adjacent the second base beam 196 at such times that the transporter 50 is aligned with the reference direction 182 and the first feedback cable 548 extends about the rear of the feedback sheave 156. In the feedback subassemblies 494 and 498, the first feedback cables 544 and 546 are attached to the feedback sheaves 152 and 154 respectively, at points diametrically opposed to points of the feedback sheaves 152, 154 adjacent the base beams 194, 196 respectively and the first feedback cables 544, 546 extend about forward portions of the feedback sheaves 152 and 154 respectively.

It will be useful at this point to consider the operation of the transporter pivotation initiating assembly 192 and the feedback assembly 470 in steering the construction machine 30 and reference is made to FIGS. 5, 12, 13, and 14 for this purpose. As noted above the drawings exemplify one manner of connecting the components in the present invention and have been drawn so as to be consistent with one another. Accordingly, the following description will be given with regard to the exemplification of the present invention shown in the drawings. Referring first to FIG. 12, a pivotation of the ternary links 236, 238 in the first directions of pivotation thereof will displace the terminal links 306-308 from the reference positions thereof, shown in solid lines in FIG. 12, at such times that the transporters 44-50 are aligned with the reference directions 176-182 so as to position the transporter representation members 326-332 (as represented by the arms 410-416 in FIG. 12) in the reference positions of the transporter representation members 326-332. Specifically, for the exemplification of the present invention shown in the drawings, the terminal links 306 and 310 will be pivoted in the first direction 472 while the terminal links 308 and 312 will be pivoted in the second direction 474. That is, the terminal links 306, 310 will be pivoted such that the valves 360, 364 (FIG. 5) connected thereto will provide a first sense of hydraulic pressure to the rams 164 and 166 and the terminal links 308, 312 will be pivoted such that the valves 362, 366 connected thereto provide a second sense of hydraulic pressure to the hydraulic rams 148 and 168. As noted above, a first sense of hydraulic pressure supplied to a ram will extend or retract the piston rod of the ram so as to pivot the transporter to which such ram corresponds in the first direction 184 while a second sense of hydraulic pressure will extend or retract the piston rod of the ram so as to pivot the transporter to which such ram corresponds in the second direction 186. Accordingly, since valves 360 and 364 are connected to rams 166 and 164 respectively, such rams corresponding to transporters 48, 44 respectively near the forward end 36 of the chassis 32, the transporters 44 and 48 will be pivoted in the first direction 184. Conversely, transporters 46 and 50, near the rear end 38 of the chassis 32, will be pivoted in the second direction 186.

The pivotation of the transporters 44-50 pivots the transporter representation members 326-332 from the reference positions thereof via the connections provided between the transporters 44-50 and the transporter representation members 328-332 by the feedback assembly 470. Specifically, transporter representation members 330 and 326, corresponding to transporters 44 and 48 respectively and represented in FIG. 13 by the arms 414 and 410 respectively, will be pivoted in the first direction 476 by the feedback subassemblies 494 and 498 respectively. Conversely, transporter representation members 328 and 332, represented in FIG. 13 by the arms 412 and 416 respectively, will be pivoted in the second direction 478. As a comparison of FIGS. 12 and 13 shows, pivotations of the arms 414 and 410 in the first direction 476 has the effect of pivoting the terminal links 310 and 306 toward the reference positions thereof on the transporter representation members 330 and 326 respectively and pivotations of the arms 412 and 416 has the effect of pivoting the terminal links 308 and 312 toward the reference positions thereof on the transporter representation members 328 and 332 respectively. Thus, the transporters 44-50 will be pivoted by the rams 148, 164-168 and will pivot the transporter representation members 326-332 corresponding thereto until such time that the arms 410-416, representing the transporter representation members 326-332 respectively, in FIG. 13, reach the positions shown in dashed lines in FIG. 13. For such pivotations of the transporter representation members 326-332, the terminal links 306-312 will be in the reference positions thereof on the transporter representation members 326-332 so that the valve members of the valves 360-366 will be in the blocked-center positions thereof wherein no hydraulic pressure is transmitted to the rams 148, 164-168. Since the angle of pivotation of each transporter representation member 326-330 is equal to the angle of pivotation of the transporter 44-50 to which such transporter representation member 326-332 corresponds, the transporters 44-50 will be pivoted, by a pivotation of the ternary links 236, 238 through the angle 418 in FIGS. 12 and 13, through angles having magnitudes as follows: transporters 44, 46 on the first side 40 of the chassis 32, to which transporter representation members 330 (arm 414 in FIG. 13) and 328 (arm 412 in FIG. 13) respectively correspond will be pivoted through the angle 430; transporters 48, 50, on the second side 42 of the chassis 32, to which transporter representation members 326 (arm 410 in FIG. 13) and 332 (arm 416 in FIG. 13) respectively correspond will be pivoted through the smaller angle 428. As noted above, the relationship between the angles 430 and 428 in FIG. 13 is made to be approximately equal to the relationship between the angles 458 and 460 in FIG. 14 with the result that the transporters 44-50 are positioned such that the lines along which the ground engagement members thereof roll are substantially the lines 434-440 respectively, in FIG. 14. Accordingly, the chassis 32 will turn about the turning center 432 on the first side 40 of the chassis 32. As described above, such turning center is disposed along the line 450 which longitudinally bisects the rectangular array of transporters 44-50 on the chassis 32 and the line 450 has been drawn on FIG. 3. In the preferred embodiment of the present invention, the cutting tool 54 is a rotating drum cutter having an axis defined by the line 450 so that steering of the construction machine 30 sweeps the cutting tool 54 in an arc centered on a turning center such as the turning center 432. As will be clear to those skilled in the art, the inside radius of the arc along which the cutting tool 54 is swept will depend upon the lateral placement of the cutting tool 54 on the chassis 32. As shown in FIG. 3, the cutting tool 54 is preferably placed assymmetrically with respect to the sides 40, 42 of the chassis 32. That is, the cutting tool 54 is generally displaced relative to the central frame 34 toward the first side 40 of the chassis 32, such side of the chassis 32 being the side thereof whereon the operator's cabin 188 is disposed. Such placement of the cutting tool 54 permits the construction machine 30 to be steered in a circle about an obstacle, such as a manhole or the like, having dimensions comparable to obstacles to be found in a work surface such as a roadway. It will be noted that such placement of the cutting tool 54 places the mounting well 90 and accordingly, the transporter 46 inside the cut 56 made by the cutting tool 54. The extent of the cut 56 to encompass the transporter 46 will be referred to hereinbelow.

It will be noted by those skilled in the art that the above mode of steering of the construction machine is not dependent upon the displacement of the axes of pivotation of the valve members of the valves 360-366 from the axes of pivotation of the transporter representation members 326-332 on the case 198 as has been shown in FIG. 11 for the mounting of the valve 360 on the transporter representation member 326. Rather, the valve 360 can be mounted on the bracket 380 so that the axes 350 and 384 coincide and the terminal link 306 can be lengthened accordingly. (Similar modifications can be made with regard to the valves 362-366 and the terminal links 308-312.). The purpose of displacing the axis 384 from the axis 350 can be seen from a comparison of FIGS. 12 and 13. In general, the separation of the axes 350 and 384 results in the angles 422 and 420, through which the terminal links 306-312 are pivoted for a specific angle of pivotation 418 of the ternary links 236, 238 at such times that the transporter representation members 326-332 are in the reference positions thereof, being larger than the angles 430 and 428 through which the transporter representation members 326-332 are pivoted for the pivotation 418 of the ternary links 236, 238, to return the terminal links 306-312 to the reference positions thereof. Thus, the off-center mounting of the valves 360-366 on the transporter representation members 326-332 enhances the steering of the construction machine 30 by effectively reducing the angular extent of the blocked-center positions of the valve members of the valves 360-366 to permit more precise adjustment of the positions of the transporters 44-50 on the chassis 32.

Referring once again to FIGS. 1, 2 and 3, the construction machine 30 includes a shroud 600 which is secured to the underside of the base beams 194, 196 and which extends transversely across the chassis 32 to support the cutting tool 54. The shroud 600 has a central portion 601 having an open first end 602 (FIG. 1) adjacent the first side 40 of the chassis 32 and a similar open second end (not designated in the drawings) adjacent the second side 42 of the chassis 32. A flange 604 is formed on the first end 602 of the central portion 601 of the shroud 600, the flange 604 having the general shape of an inverted letter U, and a groove 606 is formed about the interior portions of the flange 604. An end plate 608 is bolted to the flange 604 and extends across upper portions of the first end 602 of the central portion 601 of the shroud 600 so that the groove 606 and end plate 608 coact to form a channel extending about the first end 602 of the central portion 601 of the shroud 600. (Portions of the end plate 608 have been cut away in FIG. 1 to show the flange 604 and the groove 606.) A first skid plate 610 extends across lower portions of the first end 602 of the central portion 601 of the shroud 600 and portions of the first skid plate 610 extend into the channel formed by the groove 606 and the end plate 608 so that the first skid plate 610 can slide along a substantially vertical line in the channel so formed. A bearing 612 is mounted on the end plate 608 to support one end of a shaft 614 whereon the cutting tool 54 is mounted. (A rectangular aperture 616 is formed in the skid plate 610 to provide clearance between the skid plate 610 and the bearing 612. A cross piece, not shown, extends across the top of the aperture 616 to prevent the skid plate 610 from being dislodged from the shroud 600 should the chassis 32 be raised via the rams disposed along the axes of the transporters 44-50. A portion of the skid plate 610 has been cut away to show the flange 604 and the groove 606.) A forward skid 618 is bolted to the first skid plate 610 near the forward end 620 thereof and a rear skid 622 is bolted to the first skid plate 610 near the rear end 624 thereof. The skids 618, 622 engage uncut portions of the work surface 52 near the first end 72 of the cutting tool 54 so as to locate such uncut portions of the work surface 52 adjacent one side of the cut 56 relative to the chassis 32. An indicator rod mount 626 is bolted to the skid plate 610 with the forward skid 618 for a purpose to be described below.

The central portion 601 of the shroud 600 is closed adjacent the second side 42 of the chassis 32 in the same manner that the end 602 is closed. That is, as shown in FIG. 2, the central portion 601 of the shroud 600 is closed by an end plate 628, similar to the end plate 608, and a vertically slidable second skid plate 630, similar to the skid plate 610. A bearing (not shown) mounted on the end plate 628 supports the end of shaft 614 (not shown in FIG. 2) near the second end 76 of the cutting tool 54 in the same manner that the shaft 614 is supported near the first end 72 of the cutting tool 54. Similarly, the second skid plate 630 is provided with a forward skid 632, a rear skid 634 and an indicator rod mount 636, the indicator rod mount being bolted to the second skid plate 630 with the forward skid 632 in the same manner that the indicator rod mount 626 is bolted to the first skid plate 610 with the skid 618.

The shaft 614 extends laterally of the shroud 600 on the second side 42 of the chassis 32 and a hydraulically driven cutting tool drive assembly 640 is mounted on the end plate 628 to provide a means for rotating the cutting tool 54. The shroud 600 further includes a moldboard assembly 642 having a general V-shape converging toward the rear end 38 of the chassis 32 to deposit asphalt cut from the work surface 52 along selected portions of the cut 56.

The mounting of the cutting tool 54 via the end plates 608, 628 which are rigidly secured to the chassis 32 by means of the central portion 601 of the shroud 600 permits the cutting tool 54 to be positioned with respect to the work surface 52 via positioning the chassis 32 relative to the work surface 52 and, as has been previously noted, the construction machine includes a conventional hydraulic circuit (not shown) for positioning the chassis 32. Such positioning of the chassis 32 can be in response to hydraulic control signals, as is known in the art, and the machine 30 is provided with a hydraulic sensor 644 (FIGS. 1 and 3) on the first side 40 of the chassis 32 near the first end 72 of the cutting tool 54 and a hydraulic sensor 646 (FIGS. 2 and 3) on the second side 42 of the chassis 32 near the second end 76 of the cutting tool 54. The sensors 644, 646, which can be mounted on the chassis 32 in any convenient manner as, for example, the sensor 646 is mounted on the cutting tool drive assembly 640, are of the conventional positionable wand type. That is, the sensors 644, 646 have cases 648, 650 respectively, and wands 652, 654 extending from the cases 648, 650 respectively engage a reference so that the wands provide control signals to cause the chassis 32 to follow such reference. In many applications, the known grade averaging technique, wherein an average grade for the surface whereon work is performed is utilized as a reference, provides a convenient method for controlling the positioning of a machine so as to control cutting operations by the machine on a work surface. The grade averaging assemblies 58, 64 which will now be described, provide the construction machine 30 with the capability of utilizing such grade averaging technique.

Referring to FIG. 3, a bracket 660 having a pair of forwardly projecting, laterally spaced lugs 662, 664 is welded to the forward end 36 of the chassis 32 adjacent the first side 40 thereof. Apertures (not shown) are formed through the lugs 662, 664 to establish a pivotation axis 666, extending laterally along the forward end 36 of the chassis, to provide a means for pivotally mounting the first forward string line support apparatus 60 to the forward end 36 of the chassis 32 as will be described below. A similar bracket 668, having a similarly disposed pair of apertured lugs 670, 672, similarly provides a means for pivotally connecting the second forward stringline support apparatus 66 to the forward end 36 of the chassis 32 for pivotation about a laterally extending axis 674. A bumper 676 is welded to the rear end 38 of the chassis 32 and extends transversely thereacross. Adjacent the first side 40 of the chassis 32, a pair of rearwardly projecting, laterally spaced lugs 678, 680 are welded to the bumper 676 and a similar pair of lugs 682, 684 is welded to the bumper 676 adjacent the second side 42 of the chassis 32. The lugs 678-684 have apertures (not shown) in the manner of the lugs 662, 664, 670, and 672 for pivotally mounting the first rear stringline support apparatus 62 on the rear end 38 of the chassis 32, adjacent the first side 40 thereof, such that the first rear stringline support apparatus 62 will pivot about a laterally extending axis 686 and for pivotally mounting the second rear stringline support apparatus 68 on the rear end 38 of the chassis 32, adjacent the second side 42 thereof, such that the second rear stringline support apparatus 68 will pivot about a laterally extending axis 688. The stringline support apparati 60, 62, 66 and 68 engage the work surface 54 and are positioned thereby about the axes 666, 686, 674, and 688 so that portions of the stringline support apparati 60, 62, 66 and 68, displaced from the axes 666, 686, 674 and 688 respectively, are moved vertically with respect to the chassis 32 by changes in the grade of the work surface 54. A first stringline 689 is connected between such vertically moving portions of the first forward string line support apparatus 60 and the first rear stringline support apparatus 62 and extends along the first side 40 of the chassis 32. The wand 652 of the hydraulic sensor 644 on the first side 40 of the chassis 32 engages medial portions of the first stringline 689 to provide hydraulic control signals to the control circuit (not shown) for positioning the chassis 32 in response to changes in the position of the first stringline 689 in a conventional manner. A second stringline 691 is similarly connected between the second forward stringline support apparatus 64 and the second rear stringline support apparatus 68 and medial portions of the stringline 691 are similarly engaged by the wand 654 of the hydraulic sensor 646 on the second side 42 of the chassis 32 for providing hydraulic control signals to the control circuit (not shown).

Figure 16:
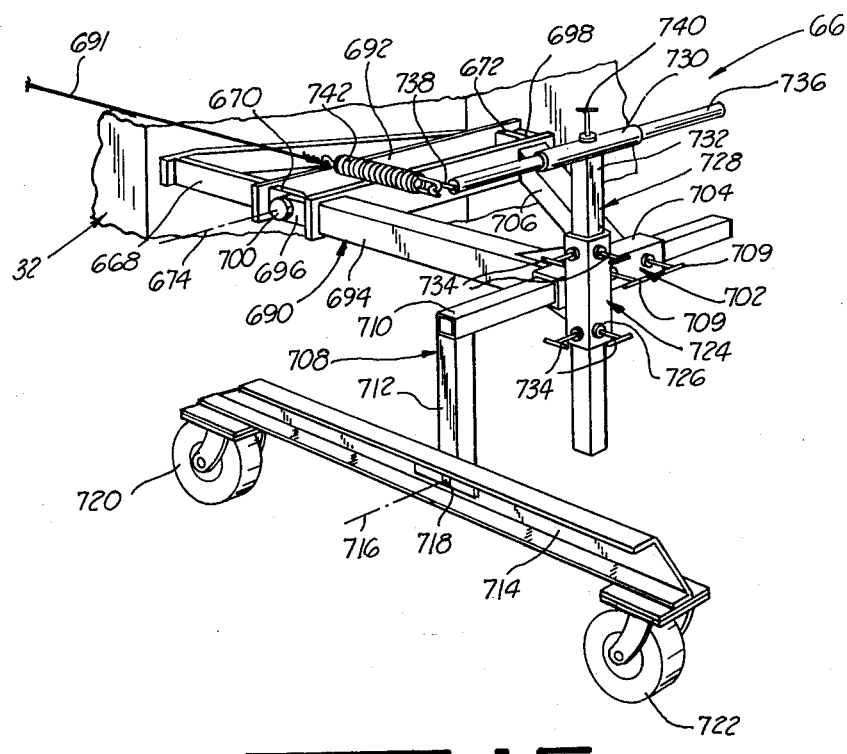
FIG. 16 is a perspective view of one of the stringline support assemblies.

The pairs of lugs, 662 and 664, 670 and 672, 678 and 680, and 682 and 684 are equally spaced and each of the stringline support apparati 60, 62, 66 and 68 is constructed in the same manner and connected to the lugs in the same manner. FIG. 16, wherein is shown the second forward stringline support apparatus 66, has been provided to illustrate the common construction of the stringline support assemblies and the common connection thereof to the lugs.

As shown in FIG. 16, the second forward stringline support apparatus 66 has a pivot arm 690 comprising a strap 692 and an arm member 694 welded to one side of the strap 692 near one end thereof, the arm member 694 extending transversely from the strap 692 so as to shape the pivot arm 690 in the general form of the letter L. A pair of lugs 696, 698 are welded to the other side of the strap 692, near the ends of the strap 692, and the lugs 696, 698 are spaced to fit about the lugs 670, 672 on the bracket 668 in an abutting relation with the lugs 670, 672. Apertures (not shown) are formed through the lugs 696, 698 to align with the apertures (not shown) in the lugs 670, 672 and a pin 700, inserted through the apertures in the lugs 670, 672, 696 and 698 is utilized to connect the pivot arm 690 to the lugs 670, 672 for pivotation of the pivot arm 690 about the axis 674. One end of the pin 700 is enlarged and a transverse hole (not shown), accepting a clip (not shown), is formed through the other end of the pin 700 to facilitate removal and connection of the pivot arm 690 from the lugs 670, 672 for a purpose to be described below.

At the distal end 702 of the pivot arm 690, the pivot arm 690 further comprises a tubular member 704 welded to the arm member 694. The tubular member 704 is constructed of square tubing and is connected near one end thereof to the arm member 694 in a parallel relation with the strap 692 so as to be generally parallel to the axis 674 at such times that the second forward stringline support apparatus 66 is mounted on the chassis 32. The tubular member 704 extends from the arm member 694 in the same direction that the strap 692 extends from the arm member 694 and, for a purpose to be described below, has a length approximately half that of the strap 692. A brace 706, connecting the ends of the strap 692 and tubular member 704 opposite the ends thereof welded to the arm member 694, is utilized to form the pivot arm 690 into a rigid structure. The second forward stringline support apparatus further comprises a walking beam support arm 708 constructed of square tubing of a size to telescope within the tubular member 704 and the tubular member 704 is provided with set screws 709, which can be screwed into threaded holes formed in one wall thereof, so that a portion of the walking beam support arm 708 can be inserted into the tubular member 704 and secured thereto via the set screws 709.

The second forward walking beam support arm 708 has two portions 710, 712 which are welded together so as to shape the walking beam support arm 708 into the general form of the letter L. When the second forward stringline support apparatus 66 is assembled on the chassis 32, the portion 710 is disposed in the tubular member 704 with the portion 712 depending therefrom as shown in FIG. 16. A bearing (not shown) is mounted in lower portions of the portion 712 for pivotally mounting a walking beam 714 on the walking beam support arm 708 such that the walking beam 714 extends transversely to the tubular member 704 and pivots about an axis 716 generally parallel to the tubular member 704. That is, the axis 716 is generally parallel to the axis 674. A pin 718 mounted on the walking beam 712 extends into the bearing (not shown) on the portion 712 of the walking beam support arm 708 and is suitably secured therein for mounting the walking beam 714 thereon. Casters 720, 722 mounted on the ends of the walking beam 714 engage the work surface 52 so as to vertically position the distal end 702 of the pivot arm 690 as the machine 30 moves along the work surface 52.

A stringline attachment assembly 724 is mounted on the tubular member 704 for attaching the stringline 691 to the second forward stringline support apparatus 66. The stringline attachment assembly 724 comprises a length of square tubing 726 which is welded to the tubular member 704, opposite the arm member 694, and is disposed transversely to the arm member 694 and the tubular member 704. A T-piece 728, formed of a length of round tubing 730 welded transversely across one end of a length of square tubing 732, sized to telescope in the square tubing 726, is mounted in the square tubing 726 via insertion of the square tubing 732 therein and securing the T-piece 728 to the square tubing 726 via set screws 734 which screw into holes formed in the square tubing 726. A rod 736, having a hook 738 on one end thereof, slides within the round tubing 730 and is secured therein via a set screw 740. The stringline 691 is connected to the hook 738 via a spring 742 which, when the other end of the stringline 691 is connected to a hook (not shown), similar to the hook 738 and mounted on the second rear stringline support apparatus 68, maintains the stringline 691 in a taut condition extending along the second side 42 of the chassis 32.

The stringline support apparati 60, 62 and 68 are constructed in the same manner as the stringline support apparatus 66 so that it will not be necessary to provide a detailed description of the stringline support apparati 60, 62 and 68 for purposes of the present disclosure. Rather, it suffices to note the common construction of the stringline support apparati, 60, 66, 62 and 68 and to designate major components of the stringline support apparati 60, 62 and 68 in FIGS. 1, 2 and 3 with the numerical designations used for such components of the second forward stringline support apparatus 66 in FIG. 16.

The indicator assembly, comprising the indicator subassemblies 70, 74 and 78, shown in FIGS. 1, 2 and 3, provides the operator of the construction machine 30 with a particularly convenient means for manually controlling the position of the chassis 32 with respect to the work surface 52 and for initially positioning the chassis 32 with respect to the work surface 52 for control of the height and attitude of the chassis 32 via one or both of the grade averaging assemblies 58 and 64 and the hydraulic control circuit (not shown). (As will be clear to those skilled in the art, control circuits are available to permit a variety of modes of control of such height and attitude.). The indicator subassemblies 70 and 74 provide direct visual indications of the depth of the cut 56, at each side thereof, so as to provide indirect visual indications of the height of selected portions of the chassis 32 above cut portions of the work surface 52, such indirect indications of height following from the fixing of the cutting tool 54 on the underside of the chassis 32. The indicator subassembly 78 provides an indirect visual indication of the height of the chassis 32 above cut portions of the work surface 52. Specifically, the first indicator sub-assembly 70 provides an indirect visual indication of the height of a first location 752 (FIG. 1), a selected distance above the first end 72 of the cutting tool 54, above cut portions of the work surface 52; the second indicator sub-assembly 74 provides an indirect visual indication of the height of a second location 754 (FIG. 2), a selected distance above the second end 76 of the cutting tool 54, above cut portions of the work surface 52; and the third indicator subassembly 78 provides an indirect visual indication of the height of a third location 756 (FIG. 1), on the cap 96 of the mounting well 90, above cut portions of the work surface 52. The locations 752, 754 and 756 project onto a triangle, shown in phantom lines and designated 750 in FIG. 3 so that the heights of the three locations 752, 754 and 756, will specify the position of the chassis with respect to the work surface 52. The purpose of indicating the heights of the locations 752, 754 and 756 indirectly is for the convenience of the operator of the machine 30 as will be discussed below.

Figure 17:
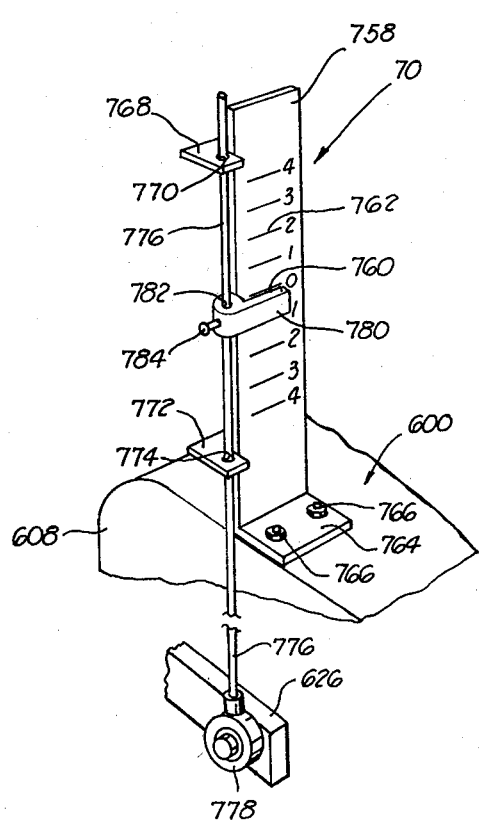
FIG. 17 is a perspective view of the first indicator subassembly of the indicator assembly.

Turning now to FIG. 17, shown therein is the first indicator subassembly 70. The first indicator subassembly 70 comprises a first scale 758, extending substantially vertically on the chassis 32 and having position indicia marked along the length thereof. The position indicia include a reference indicium 760 marked with the numeral "0" and a plurality of auxiliary indicia 762 marked with numerals indicating the distance of each auxiliary indicium from the reference indicium 760. (For clarity of illustration, only one of the auxiliary indicia 762 have been so designated in FIG. 17.) The first scale 758 has a flange 764 on the lower end thereof and the first scale 758 is conveniently mounted on the chassis 32 by screws 766 which secure the first scale 758 to the end plate 608 of the shroud 600. Near the upper end of the first scale 758, an L-shaped rod guide 768 is attached to the side thereof opposite the side bearing the position indicia 760, 762 and the leg of the L extends about one side of the first scale 758 so as to be positioned to one side of the indicia 760, 762. An aperture 770 is formed through the leg of the L. A similar rod guide 772, having a similarly positioned aperture 774, is similarly attached to the first scale 758 near the lower end thereof. A first indicator rod 776 extends through the apertures 770, 774 and is positioned thereby alongside the indicia 760, 762 on the first scale 758. The first indicator rod 776 extends downwardly of the first scale 758 and a bearing 778 is fixed to the lower end thereof. The first indicator rod 776 is bolted, via the bearing 778, to the indicator rod mount 626 which, as noted above, is bolted to the first skid plate 610. Since the first skid plate 610 is supported by uncut portions of the work surface 52 adjacent the side of the cut 56 nearest the first end 72 of the cutting tool 54, the first skid plate 610 provides a means for locating such uncut portions of the work surface 52 for the first indicator sub-assembly 70. A pointer 780 having an aperture 782 formed therethrough to slide on the first indicator rod 776 is mounted on the first indicator rod 776 between the rod guides 768, 772 and portions of the pointer 780 overlay the indicia 760, 762 on the first scale 758. A set screw 784 is utilized to secure the pointer 780 to the first indicator rod 776 in the usual manner so that the pointer 780 can be selectively positioned on the first indicator rod 776 for a purpose to be described below.

The second indicator subassembly 74 (FIG. 2) similarly comprises a second scale 786, a second indicator rod 788, and a second pointer 789 mounted on the second indicator rod 788. The second scale 786 is identical to the first scale 758 and the second indicator rod differs from the first indicator rod 776 only in length. It is convenient for the operator of the construction machine 30 for the location 754 whereat the second scale 786 is disposed to be placed at a greater elevation on the chassis 32 than the location 752 whereat the first scale 758 is disposed on the greater length of the second indicator rod 788 permits the second indicator rod 788 to be connected to the indicator rod mount 636 on the second skid plate 630 in the same manner that the first indicator rod 776 is connected to the indicator rod mount 626 on the first skid plate 610. The scales 758 and 786 are observable by the operator of the machine 30 via a window (not shown) formed near the bottom of the operator's cabin 188 and in the wall thereof facing the forward end 36 of the chassis 32 and via a window 790 (FIG. 2) facing the second side 42 of the chassis 32.

Figure 18:
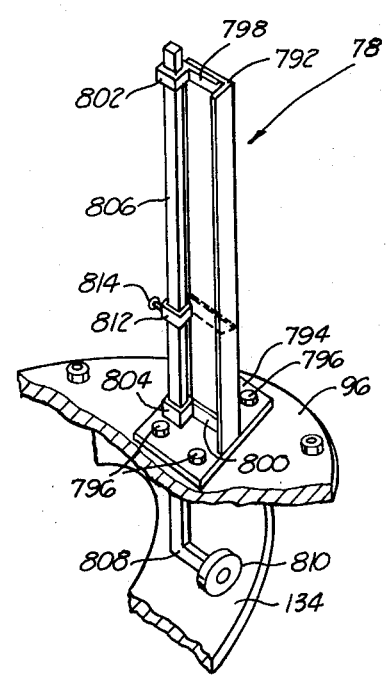
FIG. 18 is a perspective view of the third indicator subassembly of the indicator assembly.

Referring now to FIG. 18, the third indicator subassembly 78 includes a third scale 792 which is mounted on the cap 96 of the mounting well 90 above the aperture 98 formed therethrough. The third scale 792 extends substantially vertically from the cap 96 and has a flange 794 on the lower end thereof which is secured to the cap 96 via screws 796. As shown in FIG. 1, the placement of the third scale 792 on the mounting well 90, positions the third scale 792 behind the operator's cabin 188 and a window (not shown) is provided in the wall of the operator's cabin 188 facing toward the rear end 38 of the chassis 32 to permit the operator of the construction machine 30 to observe the third scale 792. The third scale 792 is oriented to present one side thereof to the operator of the construction machine 30 and position indicia (not shown), identical to the position indicia 760, 762 are marked on such side of the scale 792 presented to the operator of the construction machine 30.

Returning to FIG. 18, rod guides 798 and 800 are attached to the third scale 792, at the top and bottom thereof and on the side thereof facing away from the operator's cabin 188. The rod guides 798, 800 are conveniently formed from strips of sheet metal bent so as to form square loops 802, 804 near one end of the rod guide 798 and the rod guide 800 respectively. The square loops 802, 804 are positioned to one side of the scale 792 so as to slidably position a third indicator rod 806 alongside the third scale 792. The third indicator rod 806 is constructed from square metal rod to mate with the loops 802, 804 and extends from the third scale 792, through the aperture 98 in the cap 96 into the mounting well 90. A right angle bend is formed near the lower end 808 of the third indicator rod 806 and a bearing 810 is fixed on the lower end 808 of the third indicator rod 806 so as to engage the annulus 134 on the support shaft 132 (FIG. 4) of the transporter 46 and roll thereon at such times that the transporter 46 is pivoted to steer the construction machine 30. A pointer 812 is mounted, via a set screw 814, on portions of the third indicator rod 806 between the rod guides 798, 800 and a portion of the pointer 812 (shown in phantom lines in FIG. 18) overlays the position indicia (not shown) on the third scale 792.

The indicator subassemblies 70, 74 and 78 facilitate the positioning of the chassis 32 for both manual and automatic control of the profile of the cut 56 as will now be explained. Prior to any use of the construction machine 30, the construction machine 30 can be driven onto a plane surface and positioned such that the base beams 194, 196 are parallel to such surface and such that the cutting tool 54 will grazingly contact such plane surface. With the construction machine 30 in such position, the pointers on the indicator rods 776, 788 and 806 can be positioned to overlay the reference indicium and can be clamped in such position. Thereafter, the position indicium overlaid by the pointers will specify the position of the chassis with respect to a work surface such as the work surface 52. A particular application wherein such specification is useful would be in situations wherein it is desired that the cut 56 have a rectangular profile and a selected depth for such profile. In such case, the desired profile can be established by positioning the transporters 44-50 axially along the axes of pivotation thereof such that the desired depth of cut is shown directly above the reference indicium on the scales 758 and 786 while the pointer 812 of the third indicating subassembly 76 overlays the reference indicium on the scale 792. Referring to FIG. 1, it will be clear that at such times that the chassis 32 is disposed such that the base beams 194, 196 are parallel to the surface formed by the cut 56 (so that the tool 54 is in grazing contact with the upper surface of the cut 56) the pointer 812 of the third indicator assembly 78 will overlay the reference indicium because the transporter 46 is supported, as noted above, on the surface of the cut 56 and the transporter 46 supports the pointer 812 via the third indicator rod 806. However, the indicator rods 776 and 788 are supported by the skids 618 (FIG. 1) and 636 (FIG. 2) and such skids, engaging portions of the work surface 52 adjacent the cut 56 will be displaced above the surface of the cut 56 by an amount equal to the depth of the cut. Thus, where the chassis 32 is positioned such that the first and second indicator subassemblies 70 and 74 respectively indicate the desired depth of cut while the pointer 812 of the third indicator subassembly 78 overlays the reference indicium on the scale 792, the base beams 194, 196 will parallel the upper surface of the cut 56 and the depth of the cut 56 will be equal to the desired depth.

OPERATION OF THE PREFERRED EMBODIMENT

The machine 30 is suitable for many uses wherein it is desired to form a cut in a work surface and it will be instructive for purposes of describing the operation of the machine 30 to consider an example of a use of the machine 30. It is contemplated that the construction machine 30 will often be used to form a cut in the upper surface of a roadway, such cut having a selected depth and such cut following the grade of the uncut surface. It is further contemplated that the construction machine 30 will often be used in situations wherein the path along which the cut 56 is to be made will not lie along a straight line. For example, in some cases it will be necessary to form a cut about a manhole or the like. Such use is contemplated in the present example. Initially, the construction machine 30 is driven to the location where the cut 56 is to be initiated and the construction machine 30 is positioned to form the cut 56 as the construction machine 30 is driven forwardly. In many cases, automatic control of the profile of the cut 56 will be desirable and one or both of the grade averaging assemblies 58, 64 can be employed to accomplish such control. In such case, smoother portions of the work surface 52 are selected to support the walking beams of one or both of the grade averaging assemblies 58 and 64 to prevent undulations in the cut surface which might otherwise arise from roughness of the uncut surface. For example, in FIG. 16, the walking beam support arm 708 of the stringline support apparatus 66 can be positioned in the tubular member 704 to position the walking beam 714 at a selected distance to the second side of the chassis 32 so that the casters 720, 722 of the walking beam 714 can be supported by relatively smooth portions of the work surface 52 on the second side 40 of the chassis 32. However, should portions of the work surface 52 to the second side of the chassis 32 be severely marred as, by way of example, by the presence of potholes, the walking beam support arm 708 can be removed from the tubular member 704 and reinserted therein such that the walking beam 714 engages portions of the work surface 52 in front of the chassis 32. Again, a range of positions for the walking beam 714 can be selected by positioning the walking beam support arm 708 in the tubular member 704. As will be clear from FIG. 16, where the pivot arm 690 is mounted on the lugs 696 and 698 as shown therein, a dead space in the range of positioning of the walking beam 714 in front of or to the second side of the chassis 32 will exist because of the finite length of the tubular member 704. Such dead space has been eliminated in the present invention by the relative lengths of the tubular member 704 and the strap 692 and by the manner wherein the pivot arms 690 are attached to the chassis 32. As will be clear from the above description of the stringline support apparatus 66, the pivot arm 690 of the stringline support apparatus 66 is easily removed from the lugs 670 and 762 by removal of the pin 700 from the apertures formed through the lugs 670, 672 and the lugs 696, 698. The pivot arm 690 can thus be mounted with the lug 698 engaging the lug 670 and the lug 696 engaging the lug 672 and the pin 700 can then be reinserted. (The T-piece 728 is similarly removed from the tubing 726 and reinserted therein so as to extend above the inverted pivot arm 690.) With such mounting of the pivot arm 690, the arm member 694 is displaced from the second side 42 of the chassis 32 toward the center of the chassis 32 a distance equal to substantially twice the length of the tubular member 704. That is, the tubular member 704 is displaced toward the first side 40 of the construction machine 30 a distance equal to its length. Such displacement of the tubular member 704 permits the positioning of the walking beam 714 within the dead range resulting from the mounting of the pivot arm 690 on the lugs 670 and 672 as shown in FIG. 16. Thus, the walking beam 714 of the stringline support apparatus 66 can be disposed along any line extending forwardly of the chassis 32 within a range extending through approximately one-half the width of the chassis and adjacent the second side 42 thereof. A substantially equal range for positioning of the walking beam 714 is available beyond the second side 42 of the chassis 32. The walking beams of the remaining stringline support apparati 60, 62 and 68 are similarly positionable. Thus, any line extending longitudinally of the chassis 32 can be selected to indicate the grade of the work surface 52 for control purposes so that smoother portions of the work surface 52 can be used for these purposes. In addition, such line can be a composite rather than a single line. Thus, for example, where grade averaging control is to be based on the stringline 691 of the second grade averaging assembly 64 comprised of the stringline support apparati 66 and 68 adjacent the second side 42 of the chassis 32, the walking beam of the second forward stringline support apparatus 66 can be disposed along one line while the walking beam of the second rear stringline support apparatus 68 can be disposed along another line. A particularly advantageous utilization of such capability would be to position the walking beam of the second rear stringline support apparatus within the cut 56 made by the construction machine 30. That is, the construction of the grade averaging assemblies 58 and 64 permits exploitation of the smooth cut made by the construction machine 30 to be utilized in controlling the position of the chassis 32 to continue the cut 56.

Once the walking beams of the grade averaging assemblies 58 and 64 have been positioned on the chassis 32, the chassis 32 is lowered by a manual operation of the hydraulic control circuit which positions the transporters 44–50 along the axes of pivotation thereof such that the pointers of the indicator assemblies 70, 74 and 78 show the desired depth of cut 56. The stringlines 689 and 691 are then positioned, by positioning the T-piece of each of the stringline support apparati 60, 62, 66 and 68, such as the T-piece 728 of the second forward stringline support apparatus 66 shown in FIG. 16, such that the sensors 644 and 646 provide no correction signal to the hydraulic circuit (not shown) which controls the positioning of the chassis 32 relative to the work surface 52. The construction machine 30 is then driven forward over the desired path. It will be noted that after a short distance of travel, the transporter 46 will drop into the cut 56 to lower portions of the chassis 32 near the rear end thereof. However, the walking beam of the first rear stringline support apparatus 62 will, at such time, be supported by uncut portions of the work surface 52. Accordingly, the wand 652 of the sensor 644 will be raised with respect to the chassis 32 to provide a signal to the control circuit to lift the rear end of the chassis 32 by an amount equal to the depth of the cut. With such raising of the rear end 38 of the chassis 32, the pointer 812 of the third indicator subassembly 78 will be lowered with respect to the scale 792 thereof to overlay the reference indicium on the scale 792. The construction machine 30 can then be driven forward under the control of the control circuit so that the cut 56 follows the original grade of the work surface 52.

As has been previously noted, at times it will be desirable that the walking beam of one of the rear stringline support apparati 62, 68 engage portions of the work surface 52 within the cut 56. Where such is the case, the construction machine 30 is driven forward under either manual or automatic control until such walking beams can be disposed within the cut as has been described above. In such operation, the positioning of the stringlines 689, 691 is carried out after a sufficient length of the cut 56 has been formed to permit positioning of the walking beams of the rear stringline support apparati 62 and 68 within the cut 56.

Should an obstacle, such as a manhole or the like be encountered on the path of the cut 56, the operator of the construction machine 30 can position the transporters 44-50, as has been described above, so as to establish a turning center centered on the obstacle. The construction machine 30 can then be driven in an arc about the obstacle and such arc can extend through a complete circle or a portion thereof. Thus, depending upon the application of the construction machine 30, the cut 56 can be formed completely about an obstacle in an initial pass along the work surface 52 or can be formed only partly thereabout in the initial pass and such circular pass about the obstacle can be completed in a subsequent pass. When the construction machine 30 reaches the end of a path whereon the cut 56 is to be formed, the above described guidance system of the construction machine 30 permits the construction machine 30 to be turned on a small radius so that the construction machine 30 can be easily positioned for extraction from locations accessible from only one direction as would be the case, for example, where the work surface 52 is a dead end street.

In many applications, automatic control of the profile of the cut 56 will be unnecessary and the operator of the machine 30 will control the profile of the cut by manual actuation of valves which control rams disposed along the axes of pivotation 80-86 of the transporters 44-50 for raising and lowering the chassis 32 on the transporters 44-50. The first and second indicator subassemblies 70, 74 particularly facilitate such control by providing the operator of the machine 30 with direct visual readings of the depth of the cut 56 at each end of the cutting tool 54. Thus, the operator of the machine 30 can provide corrections to the profile of the cut 56, as needed, by adjusting rams along the axes of transporters on one or the other side of the chassis 32.

It is clear that the present invention is well adapted to carry out the objects and obtain the ends and advantages mentioned as well as those inherent therein. While a presently preferred embodiment of the invention has been described for purposes of the disclosure, numerous changes may be made which will readily suggest themselves to those skilled in the art and which are encompassed in the spirit of the invention disclosed and as defined in the appended claims.

What is claimed is:

1. A construction machine for doing work on a work surface, comprising:
   a chassis, having a forward end, a rear end and opposing first and second sides extending generally between the forward end and the rear end;
   a plurality of transporters attached to the chassis for supporting the chassis above the work surface and moving the construction machine therealong, wherein the transporters are pivotally connected to the chassis for pivotation about axes generally perpendicular to the work surface;
   a hydraulic pump mounted on the chassis;
   means for operating the hydraulic pump;
   a hydraulic ram connected between the chassis and each transporter, each ram connectable to the pump for turning the transporters about said axes;
   a steering mechanism carried by the chassis;
   a normally closed valve for each hydraulic ram carried by the chassis, each valve being hydraulically connected between its respective ram and the pump, whereby each valve is associated with a specific one of the transporters;
   a representation member for each transporter, each representation member being pivotally mounted on the chassis and each representation member carrying the valve associated with the representation member's respective transporter;
   means connecting the steering mechanism to the valves for opening the valves selective amounts when the steering mechanism is operated; and
   feedback means connected between each transporter and its respective representation member for pivoting the representation members so as to progressively close the valves as the transporters are turned about said axes to bring said valves to closed positions when the respective transporters are turned about said axes the desired amounts.

2. The construction machine of claim 1 having four transporters arranged in a rectangular array on the chassis, two transporters on each side of the chassis and two transporters near each end of the chassis, whereby the construction machine comprises four rams, four valves, and four representation members; wherein the means connecting the steering mechanism to the valves for opening the valves comprises:
   means for opening one pair of the valves by differing amounts when the steering mechanism is operated a selected amount; and
   means for simultaneously opening the other pair of valves by differing amounts when the steering mechanism is operated said selected amount, whereby one valve of each pair thereof is opened by a relatively larger amount and the other valve of each pair thereof is opened by a relatively smaller amount when the steering mechanism is operated;

wherein the valves, one from each pair, which are opened by said larger amounts when the steering mechanism is operated are connected to rams which turn transporters on one side of the chassis and the valves, one from each pair, which are opened by said smaller amounts when the steering mechanism is operated are connected to rams which turn transporters on the other side of the chassis; and wherein the valves are connected to the rams so as to turn the transporters near the forward end of the chassis in one direction while turning the transporters near the rear end of the chassis in the opposite direction when the steering mechanism is operated.

3. The construction machine of claim 2 wherein the means for simultaneously opening said other pair of valves by differing amounts when the steering mechanism is operated said selected amount is further characterized as being means for opening said other pair of valves by amounts substantially identical to the amounts said one pair of valves are opened when the steering mechanism is operated by said selected amount; and wherein the construction machine further comprises a cutting tool disposed along a line transversely bisecting the rectangular array of transporters on the chassis.

4. The construction machine of claim 1, 2 or 3 wherein each representation member has the form of a circular sheave mounted on the chassis for pivotation about the symmetry axis thereof and wherein each valve is mounted on one side of its associated representation member and has a valve member pivotable about an axis at least parallel to the pivotation axis of the valve's associated representation member for opening the valve.

5. The construction machine of claim 4 wherein the axis of pivotation of the valve member of each valve is displaced a preselected distance from the axis of pivotation of the valve's associated representation member on the chassis.

6. The construction machine of claim 1, 2 or 3 wherein each representation member is characterized as being a circular sheave mounted on the chassis for pivotation about its axis and having a circumferential groove formed on a preselected radius; and wherein the feedback means comprises:
   a circular feedback sheave for each transporter, each feedback sheave mounted on its respective transporter and the axis of each feedback sheave coinciding with the pivotation axis of its respective transporter, and each feedback sheave having a circumferential groove formed on a radius equal to twice the radius whereon circumferential grooves are formed in the representation members;
   a feedback subassembly connecting each feedback sheave to the representation member associated with the feedback sheave's respective transporter, comprising:
   a pulley, comprising:
      a sheave mount; and
      a sheave rotatably mounted on the sheave mount;
   a spring secured at one end thereof to the chassis;
   a first feedback cable secured at one end thereof to the feedback sheave associated with the feedback assembly including said first feedback cable, the first feedback cable extending along the circumferential groove in said feedback sheave, wherein the first feedback cable is looped over the sheave of the pulley and the other end of the first feedback cable is secured to the chassis; and
   a second feedback cable looped over the representation member connected to the feedback subassembly including said second feedback cable, wherein one end of the second feedback cable is secured to the spring and the other end of the second feedback cable is secured to the sheave mount of the pulley.

7. The construction machine of claim 1, 2 or 3 wherein each transporter comprises:
   a support shaft pivotally connected to the chassis;
   a wheel rotationally mounted on the lower end of the support shaft for rollingly engaging the work surface; and
   a hydraulic motor mounted on a support shaft and drivingly connected to the wheel; and
wherein the construction machine further comprises means for operating the hydraulic motors.

8. The construction machine of claim 6 wherein each transporter comprises:
   a support shaft pivotally connected to the chassis;
   a wheel rotationally mounted on the lower end of the support shaft for rollingly engaging the work surface; and
   a hydraulic motor mounted on a support shaft and drivingly connected to the wheel; and
wherein the construction machine further comprises means for operating the hydraulic motors.

9. The construction machine of claim 1 further comprising:
   at least one pair of stringline support apparati connected to opposite ends of the chassis adjacent one side of the chassis;
   a stringline for each pair of stringline support apparati, each end of the stringline supported by one of the stringline support apparati comprising said pair;
   means for maintaining the stringline in a taut condition; and
   means for sensing the height of a medial portion of the stringline above the work surface; and
wherein each stringline support apparatus comprises:
   a pivot arm connected at one end thereof the chassis for pivotation about an axis extending laterally of the chassis, said pivot arm having a tubular member generally parallel to said axis of pivotation of the pivot arm at the distal end of the pivot arm;
   a walking beam support arm slidably supported in the tubular member at the distal end of the pivot arm;
   means for fixing the position of the walking beam support arm in said tubular member;
   a walking beam mounted on the walking beam support arm for lateral positioning of the walking beam with respect to the chassis via positioning of the walking beam support arm in the tubular member at the distal end of the pivot arm, the walking beam extending longitudinally of the chassis and engaging the work surface to vertically position the distal end of the pivot arm as the construction machine moves along the work surface; and means mounted on the distal end of the pivot arm for supporting the one end of the stringline supported by the stringline support apparatus.

10. The construction machine of claim 9 comprising two pairs of a stringline support apparati.

11. The construction machine of claim 9 or claim 10 wherein the pivot arm of each stringline support apparatus comprises:
   an arm member mounting said tubular member at one end thereof;
   two lugs having circular apertures formed therethrough; and means on the end of the arm member opposite the tubular member, for supporting the lugs on the arm member in a spaced apart relation wherein the apertures through the lugs are positioned coaxially;
   wherein a pair of lugs are mounted on the chassis for each stringline support apparatus, said lugs for each stringline support apparatus being mounted to engage and laterally position said stringline support apparatus on the chassis and said lugs on the chassis having circular apertures formed therethrough to coaxially align with the apertures in the lugs of said stringline support apparatus; and wherein each stringline support apparatus further comprises a pin insertable through the lugs on the chassis and the lugs of said stringline support apparatus for connecting said stringline support apparatus to the chassis.

12. The construction machine of claim 1 or claim 9 further comprising:
   a cutting tool fixed to the underside of the chassis and extending transversely thereacross;
   means for positioning the chassis relative to the work surface so as to cause the cutting tool to engage the work surface and form a cut therein as the chassis is moved along the work surface;
   first indicator means for providing a direct visual indication of the depth of the cut near one end of the cutting tool; and
   second indicator means for providing a direct visual indication of the depth of the cut near the opposite end of the cutting tool.

13. The apparatus of claim 12 wherein the first indicator means comprises:
   a first indicator rod extending substantially perpendicularly to the work surface and supported by uncut portions of the work surface adjacent one side of the cut;
   a first scale disposed alongside a portion of the first indicator rod; and
   a first pointer mounted on the first indicator rod and overlaying a portion of the first scale; and
   wherein the second indicator means comprises:
   a second indicator rod extending substantially perpendicularly to the work surface and supported by uncut portions of the work surface adjacent the opposite side of the cut;
   a second scale disposed alongside a portion of the second indicator rod; and
   a second pointer mounted on the second indicator rod and overlaying a portion of the second scale.

14. The apparatus of claim 13 wherein the cutting tool is a rotating drum cutter; wherein the construction machine further comprises:
   a shroud extending transversely along the underside of the chassis about the cutting tool and rotationally supporting the ends of the cutting tool;
   means for rotating the cutting tool;
   a first skid plate mounted on one end of the shroud for sliding movement along a direction substantially perpendicular to the work surface and engaging uncut portion of the work surface adjacent one side of the cut for locating such uncut portion of the work surface relative to the chassis; and a second skid plate mounted on the other end of the shroud for sliding movement along a direction substantially perpendicular to the work surface and engaging uncut portions of the work surface adjacent the other side of the cut for locating such uncut portions of the work surface; and
   wherein the lower end of the first indicator rod is connected to the first skid plate and the lower end of the second indicator rod is connected to the second skid plate.

15. The construction machine of claim 12 further comprising thrid indicator means for providing a direct visual indication of the difference between the height of a selected portion of the chassis above cut portions of the work surface and a preselected height for said selected portion of the chassis.

16. The construction machine of claim 15 wherein a portion of the construction machine between the cutting tool and the rear end of the chassis engages cut portions of the work surface and wherein the thrid indicator means comprises:
   a third indicator rod supported by said portions of the construction machine engaging cut portions of the work surface between the cutting tool and the rear end of the chassis and extending substantially perpendicularly to said cut portions of the work surface;
   a third scale disposed alongside a portion of the third indicator rod; and
   a third pointer mounted on the third indicator rod and overlaying a portion of the third scale.

17. The construction machine of claim 16 wherein the portion of the construction machine engaging cut portions of the work surface between the cutting tool and the rear end of the chassis is one of the transporters.

18. A stringline support apparatus for a construction machine for doing work on a work surface as the construction machine moves therealong, comprising:
   a pivot arm connectable at one end thereof to one end of the construction machine for pivotation about an axis extending laterally of the construction machine, said pivot arm having a tubular member generally parallel to said axis of pivotation of the pivot arm at the distal end of the pivot arm;
   a walking beam support arm slidably supported in the tubular member at the distal end of the pivot arm;
   means for fixing the position of the walking beam support arm in said tubular member;
   a walking beam mounted on the walking beam support arm for lateral positioning of the walking beam with respect to the chassis via positioning of the walking beam support arm in the tubular member at the distal end of the pivot arm, the walking beam extending longitudinally of the chassis and engaging the work surface to vertically position the distal end of the pivot arm as the construction machine moves along the work surface; and
   means mounted on the distal end of the pivot arm for supporting one end of a stringline.

19. The stringline support apparatus of claim 18 wherein the pivot arm comprises:
   an arm member mounting said tubular member at one end thereof;
   two lugs having circular apertures formed therethrough; and
   means on the end of the arm member opposite the tubular member, for supporting the lugs on the arm member in a spaced apart relation wherein the apertures through the lugs are positioned coaxially; wherein a pair of lugs are mounted on one end of the construction machine for mounting the stringline support apparatus thereon, said lugs being mounted to engage and laterally position the stringline support apparatus on the construction machine and said lugs on the construction machine having circular apertures formed therethrough to coaxially align with the apertures in the lugs of the stringline support apparatus; and wherein the stringline support apparatus further comprises a pin insertable through the lugs on the construction machine and the lugs of the stringline support apparatus for connecting the stringline support apparatus to the construction machine.

20. An apparatus for gauging a cut made in a work surface by a planing machine of the type having a chassis supported above said surface and moved therealong and a cutting tool fixed to the under side of the chassis and engaging the surface for making the cut therein, comprising:

first indicator means for providing a direct visual indication of the depth of the cut near one end of the cutting tool, comprising:
- a first indicator rod extending substantially perpendicularly to the work surface and supported by uncut portions of the work surface adjacent one side of the cut;
- a first scale disposed alongside a portion of the first indicator rod; and
- a first pointer mounted on the first indicator rod and overlaying a portion of the first scale; and second indicator means for providing a direct visual indication of the depth of the cut made near the opposite end of the cutting tool, comprising:
- a second indicator rod extending substantially perpendicularly to the work surface and supported by uncut portions of the work surface adjacent the opposite side of the cut;
- a second scale disposed alongside a portion of the second indicator rod; and
- a second pointer mounted on the second indicator rod and overlaying a portion of the second scale.

21. The apparatus of claim 20 wherein the cutting tool is a rotating drum cutter, wherein the construction machine further comprises a shroud extending transversely along the underside of the chassis about the cutting tool; wherein said shroud is provided with a first skid plate mounted on one end of the shroud for sliding movement on the shroud along a direction substantially perpendicular to the work surface, said first skid plate engaging uncut portions of the work surface adjacent one side of the cut for locating such uncut portions of the work surface relative to the chassis of the construction machine, and a second skid plate mounted on the other end of the shroud for sliding movement on the shroud along a direction substantially perpendicular to the work surface, said first skid plate engaging uncut portions of the work surface adjacent the other side of the cut for locating such uncut portions of the work surface; and wherein the lower end of the first indicator rod is connected to the first skid plate and the lower end of the second indicator rod is connected to the second skid plate.

22. The apparatus of claim 20 further comprising third indicator means for providing a direct visual indication of the difference between the height of a selected portion of the chassis of the construction machine above cut portions of the work surface and a preselected reference height for said selected portion of the chassis, wherein a portion of the construction machine between the cutting tool and an end of the construction machine disposed over cut portions of the work surface engages cut portions of the work surface and wherein the third indicator means comprises:
- a third indicator rod supported by said portions of the construction machine engaging cut portions of the work surface between the cutting tool and said end of the chassis, the third indicator rod extending substantially perpendicular to said cut portions of the work surface;
- a third scale disposed alongside a portion of the third indicator rod; and
- a third pointer mounted on the third indicator rod and overlaying a portion of the third scale.

23. The apparatus of claim 22 wherein the construction machine comprises a plurality of transporters for supporting the chassis thereof above the work surface and moving the construction machine therealong and wherein the portion of the construction machine engaging cut portions of the work surface and supporting the third indicator rod is one of said transporters.

* * * * *

UNITED STATES PATENT AND TRADEMARK OFFICE
CERTIFICATE OF CORRECTION

PATENT NO. : 4,270,801

DATED : June 2, 1981

INVENTOR(S) : George W. Swisher, Jr., et al

It is certified that error appears in the above—identified patent and that said Letters Patent is hereby corrected as shown below:

Column 1, line 16, the word "to" should be --the--.

Column 1, line 67, the word "utilzed" should be --utilized--.

Column 2, line 16, the word "extablishing" should be --establishing--.

Column 2, line 63, the word "oeration" should be --operation--.

Column 4, line 22, the word "above" should be --about--.

Column 4, line 61, after the numeral "32" add the word --and;--.

Column 5, line 19, the word "deisel" should be --diesel--.

Column 5, line 25, the word "of" (2nd.occur.) should be --the--.

Column 5, line 27, the word "indentical" should be --identical--.

Column 5, line 28, the word "indentical" should be --identical--.

Column 5, line 36, the word "difference" should be --differences--.

Column 5, line 38, the letter "b" following the numeral "46" should be deleted.

UNITED STATES PATENT AND TRADEMARK OFFICE
CERTIFICATE OF CORRECTION

PATENT NO. : 4,270,801

DATED : June 2, 1981

INVENTOR(S) : George W. Swisher, Jr., et al

It is certified that error appears in the above—identified patent and that said Letters Patent is hereby corrected as shown below:

Column 6, line 27, the letter "s" should be --as--.

Column 7, line 18, the word "groun" should be --ground--.

Column 7, line 50, after the numeral "164" add the numeral --, 166--.

Column 8, line 9, the word "diposed" should be --disposed--.

Column 8, line 17, after the word "chassis" add the numeral --32--.

Column 8, line 24, after the word "chassis" add the numeral --32--.

Column 8, line 24, after the word "be" add the word --a--.

Column 9, line 16, the word "beam" should be --beams--.

Column 10, line 19, the word "stacking" should be --steering--.

Column 10, line 36, the words "The lug" should be the start of a new paragraph.

Column 10, line 66, the word "moun" should be --mount--.

Column 11, line 43, the word "an" should be --the--.

UNITED STATES PATENT AND TRADEMARK OFFICE
CERTIFICATE OF CORRECTION

PATENT NO. : 4,270,801
DATED : June 2, 1981
INVENTOR(S) : George W. Swisher, Jr., et al.

It is certified that error appears in the above—identified patent and that said Letters Patent is hereby corrected as shown below:

Column 12, line 2, the word "he" should be --the--.

Column 17, line 49, the word "surfaces" should be --surface--.

Column 19, line 32, "tions" should be --tion--.

Column 24, line 37, the word "where" should be --whereon--.

Column 27, line 63, the numeral "507" should be --508--.

Column 28, line 68, the word "cahssis" should be --chassis--.

Column 29, line 11, the word "thrugh" should be --through--.

Column 30, line 2, the phrase "FIG. 31" should be --FIG. 13--.

In Claim 9, line 46, after the word "thereof" add the word --to--.

UNITED STATES PATENT AND TRADEMARK OFFICE
CERTIFICATE OF CORRECTION

PATENT NO. : 4,270,801

DATED : June 2, 1981

INVENTOR(S) : George W. Swisher, Jr., et al.

It is certified that error appears in the above—identified patent and that said Letters Patent is hereby corrected as shown below:

In Claim 11, line 7, the word "means" should be the start of a new paragraph, lined up under the word "two" on line 6, column 47.

Signed and Sealed this

Eighteenth Day of May 1982

[SEAL]

Attest:

Attesting Officer

GERALD J. MOSSINGHOFF

Commissioner of Patents and Trademarks